(12) United States Patent
Otsuki et al.

(10) Patent No.: US 12,717,221 B2
(45) Date of Patent: Aug. 25, 2026

(54) PROJECTOR HAVING SPEAKER UNIT WITH AIR CIRCULATION PATH

(71) Applicant: SEIKO EPSON CORPORATION, Tokyo (JP)

(72) Inventors: Nobuyuki Otsuki, Matsumoto (JP); Keita Tsukioka, Matsumoto (JP); Toshio Matsumiya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 179 days.

(21) Appl. No.: 18/680,145

(22) Filed: May 31, 2024

(65) Prior Publication Data

US 2024/0402582 A1 Dec. 5, 2024

(30) Foreign Application Priority Data

May 31, 2023 (JP) ................................ 2023-089636

(51) Int. Cl.

| | |
|---|---|
| ***G03B 21/14*** | (2006.01) |
| ***G03B 21/16*** | (2006.01) |
| ***H04R 1/02*** | (2006.01) |
| ***H04R 1/28*** | (2006.01) |

(52) U.S. Cl.

CPC ........... *G03B 21/145* (2013.01); *G03B 21/16* (2013.01); *H04R 1/028* (2013.01); *H04R 1/2826* (2013.01)

(58) Field of Classification Search

CPC ...... G03B 21/145; G03B 21/16; H04R 1/028; H04R 1/2826

See application file for complete search history.

(56) References Cited

U.S. PATENT DOCUMENTS

| | | | | |
|---|---|---|---|---|
| 5,630,659 A * | 5/1997 | Ronzani | G09F 15/005 | 348/E5.122 |
| 5,808,704 A * | 9/1998 | Yoshikawa | G03B 21/10 | 348/789 |
| 6,139,154 A * | 10/2000 | Haba | G03B 21/16 | 349/5 |
| 6,203,159 B1 * | 3/2001 | Takizawa | G03B 21/16 | 353/61 |
| 6,350,033 B1 * | 2/2002 | Fujimori | G03B 21/16 | 353/56 |
| 6,488,378 B1 * | 12/2002 | Tabuchi | G03B 21/16 | 353/58 |

(Continued)

FOREIGN PATENT DOCUMENTS

| | | |
|---|---|---|
| JP | H10-325982 A | 12/1998 |
| JP | 2009-042506 A | 2/2009 |

*Primary Examiner* — Bao-Luan Q Le

(74) *Attorney, Agent, or Firm* — Dority & Manning, P.A.

(57) ABSTRACT

A projector includes an exterior housing having a first wall and a second wall opposite from each other, a third wall and a fourth wall opposite from each other, and a fifth wall and a sixth wall opposite from each other, a speaker unit including a first sound emitter provided in the speaker housing, and an intake fan. The first wall includes a communication port serving as a sound emission port of the first sound emitter, the fifth wall includes a contact portion that comes into contact with an installation surface, a noncontact portion that does not come into contact with the installation surface, and an air intake port provided at the noncontact portion, and the air intake fan communicates with the communication port and the air intake port.

14 Claims, 14 Drawing Sheets

(56) References Cited

U.S. PATENT DOCUMENTS 6,935,745 B1* 8/2005 Kitabayashi ......... G03B 21/145 349/5
2002/0001065 A1* 1/2002 Takizawa ............... G03B 21/16 353/31
2002/0085178 A1* 7/2002 Mihara .................. G03B 21/16 348/E5.143
2002/0140909 A1* 10/2002 Tanaka ................... F16M 11/10 353/70
2003/0071975 A1* 4/2003 Fujimori .............. H04N 9/3141 348/E5.143
2003/0081185 A1* 5/2003 Nakano ................ G03B 21/145 353/97
2003/0189694 A1* 10/2003 Yamada ............... H04N 9/3144 353/77
2005/0286027 A1* 12/2005 Bakkom ................ G03B 21/22 353/119
2012/0008095 A1* 1/2012 Sakashita ............. H04R 1/2896 353/15
2016/0227175 A1* 8/2016 Lee ........................ H04N 23/54
2018/0084233 A1* 3/2018 Lara ..................... H04N 9/3141
2018/0234770 A1* 8/2018 Kikuchi ............... H04N 9/3144
2019/0182582 A1* 6/2019 Huang ................... H04R 1/028
2020/0041883 A1* 2/2020 Chung ................. G03B 21/208
2020/0041884 A1* 2/2020 Chung ................... G03B 21/16
2021/0302817 A1* 9/2021 Yamaki ................ H04N 9/3144
2022/0413371 A1* 12/2022 Hou ....................... G03B 21/16
2023/0194966 A1* 6/2023 Hsu ........................ G03B 21/28 353/119
2023/0236483 A1* 7/2023 Kawakami ........... G03B 21/145 353/15
2023/0280641 A1* 9/2023 Hsu ...................... G03B 21/145 353/119
2024/0085769 A1* 3/2024 Chen ...................... G03B 21/16
2024/0168368 A1* 5/2024 Hautala ................ G03B 21/145

* cited by examiner 1
24
25
22
235
2A
231 232 233 234
2C 2
2B
211
236
2CR
21
27 (27A)
268
262
261
23
27 (27D)
26

PROJECTOR HAVING SPEAKER UNIT WITH AIR CIRCULATION PATH

The present application is based on, and claims priority from JP Application Serial Number 2023-089636, filed May 31, 2023, the disclosure of which is hereby incorporated by reference herein in its entirety.

BACKGROUND

1. Technical Field

The present disclosure relates to a projector.

2. Related Art

There is a known projector that cools cooling targets with outside air introduced into the housing (see, for example, JP-A-10-325982).

In the liquid crystal projector described in JP-A-10-325982, the LCD unit and the polarizing plate unit, which are the cooling targets, are air-cooled with the outside air taken in by the blower fan via the first outside air intake port and the intake duct. The intake duct is provided with the second outside air intake port, and when the first outside air intake port is closed, the air inside the liquid crystal projector is sucked via the second outside air intake port. A new airflow is thus formed inside the liquid crystal projector, and cools the LCD unit and the polarizing plate unit.

JP-A-10-325982 describes an example in which the second outside air intake port is formed of a lid that opens inward, and the lid is configured to automatically open in response to a decrease in the air pressure in the liquid crystal projector when the first outside air intake port is closed.

JP-A-10-325982 is an example of the related art.

In the liquid crystal projector described in JP-A-10-325982, however, the second outside air intake port is an opening via which the outside air is taken in in an emergency in which the first outside air intake port is closed, and is not used in a normal state. That is, in the liquid crystal projector described in JP-A-10-325982, it is necessary to provide the second outside air intake port, which is used to take in the outside air in an emergency, separately from the first outside air intake port.

Furthermore, the second outside air intake port formed of a lid that opens inward causes a problem of a more complicated configuration of the second outside air intake port, which hinders reduction in the size of the projector.

It has therefore been desired to suppress the complication of the configuration and reduce the size of the device.

SUMMARY

A projector according to a first aspect of the present disclosure includes an exterior housing having a first wall and a second wall provided to be opposite from each other in a first axis, a third wall and a fourth wall provided to be opposite from each other in a second axis perpendicular to the first axis, and a fifth wall and a sixth wall provided to be opposite from each other in a third axis perpendicular to the first and second axes, a speaker unit including a speaker housing and a first sound emitter provided in the speaker housing, and a fan provided inside the exterior housing. The first wall has a communication port that causes an interior and an exterior of the exterior housing to communicate with each other to form a sound emission port of the first sound emitter. The fifth wall includes a contact portion that comes into contact with an installation surface, a noncontact portion that is provided continuously with the first wall and does not come into contact with the installation surface, and an intake port that is provided at the noncontact portion and exerts a flow path resistance smaller than a flow path resistance exerted by the communication port. The speaker housing is disposed to oppose each of the communication port and the intake port, and the fan communicates with the communication port and the intake port and sucks air outside the exterior housing.

A projector according to a second aspect of the present disclosure includes an exterior housing having a first wall and a second wall provided to be opposite from each other in a first axis, a third wall and a fourth wall provided to be opposite from each other in a second axis perpendicular to the first axis, and a fifth wall and a sixth wall provided to be opposite from each other in a third axis perpendicular to the first and second axes, a speaker unit including a speaker housing, a first sound emitter provided in the speaker housing, and a second sound emitter configured to emit a higher-pitched sound than a sound emitted from the first sound emitter, a fan provided inside the exterior housing, and a sealer provided inside the exterior housing. The first wall has a communication port that causes an interior and an exterior of the exterior housing to communicate with each other to form a sound emission port of the first sound emitter. The fifth wall includes a contact portion that comes into contact with an installation surface, a noncontact portion that is provided continuously with the first wall and does not come into contact with the installation surface, and an intake port that is provided at the noncontact portion and exerts a flow path resistance smaller than a flow path resistance exerted by the communication port. The speaker housing is disposed to oppose each of the first wall and the fifth wall. The fan communicates with the communication port and the intake port and sucks air outside the exterior housing. The sealer separates the first sound emitter and the second sound emitter from each other and surrounds the first sound emitter to form a duct that causes the communication port and the intake port to communicate with the fan.

BRIEF DESCRIPTION OF THE DRAWINGS

FIG. 6 is a diagrammatic view showing the configuration of a light source apparatus according to the first embodiment.

FIG. 10 is a cross-sectional view showing the projector according to the first embodiment.

DESCRIPTION OF EMBODIMENTS

First Embodiment

A first embodiment of the present disclosure will be described below with reference to the drawings.

Configuration of Projector

Figure 1:
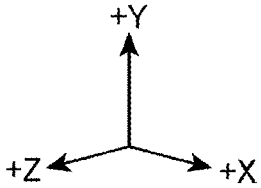
FIG. 1 is a perspective view showing a projector according to a first embodiment.
Figure 2:
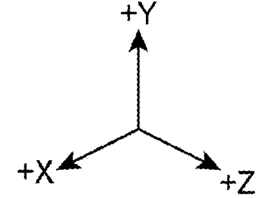
FIG. 2 is another perspective view showing the projector according to the first embodiment.

FIGS. 1 and 2 are perspective views showing a projector 1 according to the present embodiment. In detail, FIG. 1 is a perspective view showing the projector 1 viewed from the upper front side, and FIG. 2 is a perspective view showing the projector 1 viewed from the lower rear side.

The projector 1 according to the present embodiment projects image light according to image information onto a projection receiving surface. The projector 1 includes an exterior housing 2, as shown in FIGS. 1 and 2.

In the following description, three directions perpendicular to one another are called X, Y, and Z directions toward the positive ends thereof. The Y direction toward the positive end thereof is the direction that vertically extends upward from an installation surface at which the projector 1 is installed. When the projector 1 is viewed from the side facing the positive end of the Y direction, the Z direction toward the positive end thereof is the direction in which the projector 1 projects the image light.

Although not shown, the opposite direction of the X direction toward the positive end thereof is called the X direction toward the negative end thereof, the opposite direction of the Y direction toward the positive end thereof is called the Y direction toward the negative end thereof, and the opposite direction of the Z direction toward the positive end thereof is called the Z direction toward the negative end thereof. Although not shown, an axis along the X direction toward the positive end thereof is called an X-axis, an axis along the Y direction toward the positive end thereof is called a Y-axis, and an axis along the Z direction toward the positive end thereof is called a Z-axis.

Configuration of Exterior Housing

The exterior housing 2 is a housing that constitutes the exterior of the projector 1, as shown in FIGS. 1 and 2. The exterior housing 2 includes an upper case 2A, which constitutes a portion facing the positive end of the Y direction, a lower case 2B, which constitutes a portion facing the negative end of the Y direction, and a fabric unit 2C, which constitutes a portion facing the negative end of the Z direction, a portion facing the positive end of the X direction, a portion facing the negative end of the X direction. The exterior housing 2 is formed in a substantially rectangular-box-like shape that is the combination of the upper case 2A, the lower case 2B, and the fabric unit 2C. The exterior housing 2 has a front surface 21, a rear surface 22, a right side surface 23, a left side surface 24, a top surface 25, a bottom surface 26, and an inclining surface 27.

The front surface 21 is formed by a portion of the upper case 2A that faces the negative end of the Y direction and a portion of the lower case 2B that faces the positive end of the Y direction. The rear surface 22, the right side surface 23, and the left side surface 24 are each formed by a portion of the upper case 2A that faces the negative end of the Y direction, a portion of the lower case 2B that faces the positive end of the Y direction, and the fabric unit 2C. The top surface 25 is formed by the upper case 2A, and the bottom surface 26 is formed by the lower case 2B.

Configurations of Front Surface and Rear Surface

The front surface 21 shown in FIG. 1 and the rear surface 22 shown in FIG. 2 are surfaces opposite from each other along the Z-axis. The front surface 21 corresponds to a second wall, and the rear surface 22 corresponds to a first wall.

The front surface 21 is a side surface of the exterior housing 2 that faces the positive end of the Z direction, and is continuous with the bottom surface 26, as shown in FIG. 1. The front surface 21 is provided with a projection port 211, via which the image light to be projected onto the projection receiving surface passes.

The rear surface 22 is a side surface of the exterior housing 2 that faces the negative end of the Z direction, as shown in FIG. 2. The portion of the rear surface 22 that faces the negative end of the Y direction is formed by the fabric unit 2C, which covers a speaker unit 6, which will be described later, from the side facing the negative end of the Z direction.

Configurations of Right Side Surface and Left Side Surface

The right side surface 23 shown in FIG. 1 and the left side surface 24 shown in FIG. 2 are surfaces opposite from each other along the X-axis. One of the right side surface 23 and the left side surface 24 corresponds to a third wall, and the other corresponds to a fourth wall.

The right side surface 23 is a side surface of the exterior housing 2 that faces the positive end of the X direction, as shown in FIG. 1. A power button 231, connection terminals 232 to 235, and an inlet 236 are provided at the right side surface 23.

The left side surface 24 is a side surface of the exterior housing 2 that faces the negative end of the X direction, as shown in FIG. 2. The left side surface 24 is provided with discharge ports 241 and 242, via which a cooling gas having flowed through the interior of the exterior housing 2 is discharged.

Configuration of Fabric Unit

Figure 3:
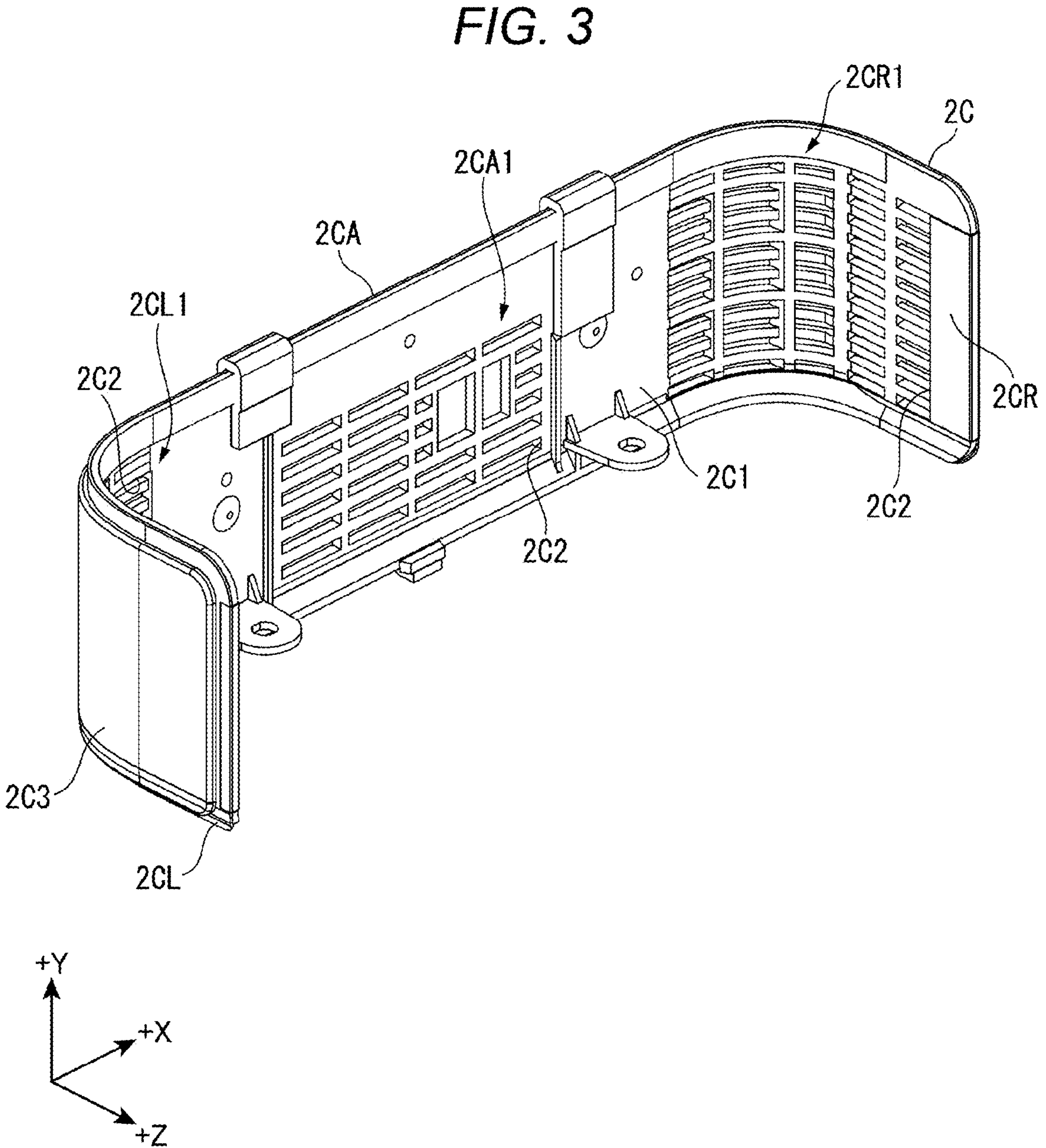
FIG. 3 is a perspective view showing a fabric unit according to the first embodiment.
Figure 4:
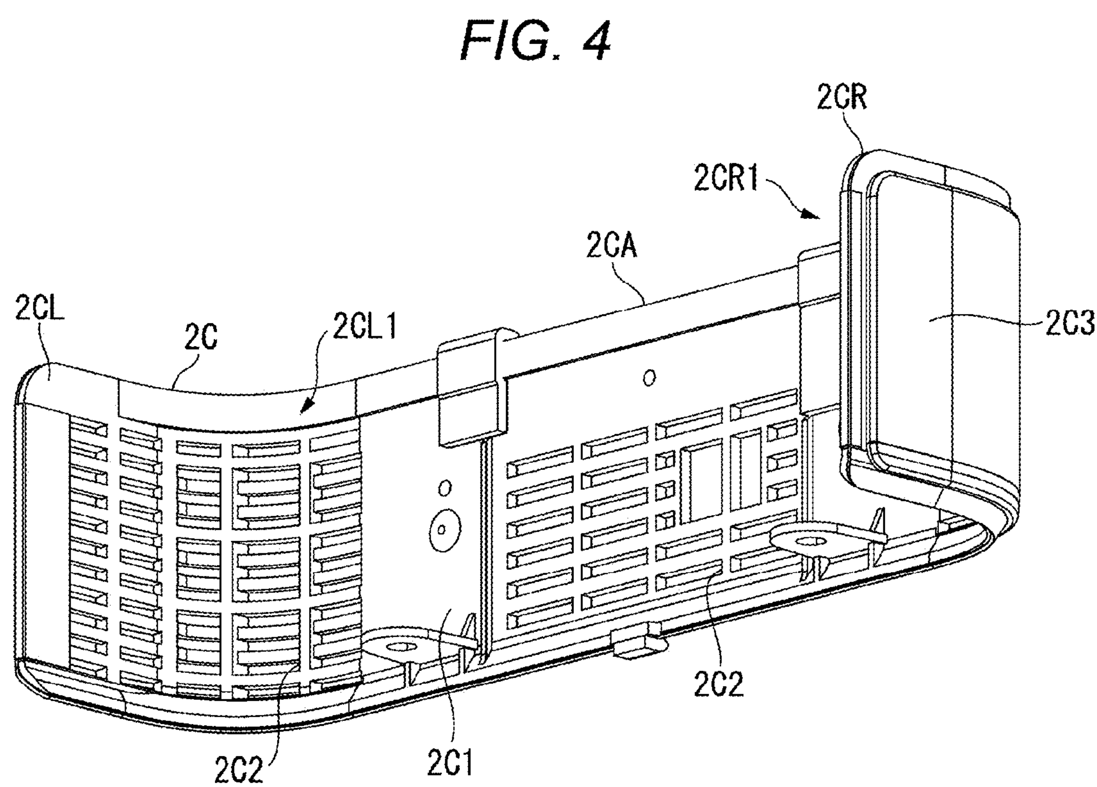
FIG. 4 is a perspective view showing the fabric unit according to the first embodiment.
Figure 4:
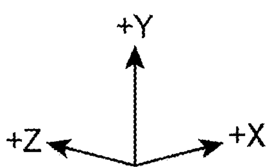

FIGS. 3 and 4 are perspective views showing the fabric unit 2C viewed from the interior of the exterior housing 2. In detail, FIG. 3 is a perspective view showing the fabric unit 2C viewed from the side facing the negative end of the X direction, the positive end of the Z direction, and the positive end of the Y direction, and FIG. 4 is a perspective view showing the fabric unit 2C viewed from the side facing the positive end of the X direction, the positive end of the Z direction, and the negative end of the Y direction. In FIGS. 3 and 4, reference characters are given only to some of a plurality of opening sections 2C2, which constitute communication ports 2CA1, right sound emission ports 2CR1, and left sound emission ports 2CL1.

The fabric unit 2C is disposed so as to extend across the rear surface 22 and to part of the right side surface 23 and the left side surface 24, as shown in FIGS. 1 and 2.

The fabric unit 2C is formed of the combination of a frame 2C1 and a fabric 2C3, as shown in FIGS. 3 and 4.

The frame 2C1 is formed in a substantially U shape when viewed from the side facing the positive end of the Y direction. The frame 2C1 includes a rear surface section 2CA, which constitutes a portion of the rear surface 22, which faces the negative end of the Z direction, the portion facing the negative end of the Y direction, a right side surface section 2CR, which constitutes a portion of the right side surface 23, which faces the positive end of the X direction, the portion facing the negative ends of the Y and Z directions, and a left side surface section 2CL, which constitutes a portion of the left side surface 24, which faces the negative end of the X direction, the portion facing the negative ends of the Y and Z directions.

The rear surface section 2CA has the communication ports 2CA1, which serve as sound emission ports of a first sound emitter 62, which will be described later.

The right side surface section 2CR has the right sound emission ports 2CR1, which serve as sound emission ports of a second sound emitter 63, which will be described later.

The left side surface section 2CL has the left sound emission ports 2CL1, which serve as sound emission ports of a second sound emitter 64, which will be described later.

The communication ports 2CA1, the right sound emission ports 2CR1, and the left sound emission ports 2CL1 are each formed of the plurality of opening sections 2C2 arranged horizontally and vertically, and cause the interior and the exterior of the exterior housing 2 to communicate with each other. The flow path resistance exerted on the cooling gas flowing through the communication ports 2CA1, the flow path resistance exerted on the cooling gas flowing through the right sound emission ports 2CR1, and the flow path resistance exerted on the cooling gas flowing through the left sound emission ports 2CL1 are equal to one another.

The fabric 2C3 formed of a net is provided at the outer surface of the frame 2C1. That is, the fabric 2C3 covers the communication ports 2CA1, the right sound emission ports 2CR1, and the left sound emission ports 2CL1 at the outer side of the frame 2C1.

As described above, the fabric unit 2C, which constitutes part of each of the rear surface 22, the right side surface 23, and the left side surface 24 of the exterior housing 2, includes the communication ports 2CA1, the right sound emission ports 2CR1, and the left sound emission ports 2CL1. The exterior housing 2, to which the fabric unit 2C is attached, therefore has the communication ports 2CA1, the right sound emission ports 2CR1, and the left sound emission ports 2CL1.

Configurations of Top Surface and Bottom Surface

The top surface 25 shown in FIG. 1 and the bottom surface 26 shown in FIG. 2 are surfaces opposite from each other along the Y-axis. The top surface 25 corresponds to a sixth wall, and the bottom surface 26 corresponds to a fifth wall.

The top surface 25 is a surface of the exterior housing 2 that faces the positive end of the Y direction, as shown in FIG. 1.

The bottom surface 26 is a surface of the exterior housing 2 that faces the negative end of the Y direction, as shown in FIG. 2. In other words, the bottom surface 26 is an opposing surface that opposes the installation surface at which the projector 1 is placed, and is a portion of the exterior housing 2 that is visible from the side facing the negative end of the Y direction.

The bottom surface 26 has a protrusion 261 and a step 263.

The protrusion 261 is a portion protruding toward the negative end of the Y direction and located substantially at the center of the bottom surface 26, and is formed in a substantially rectangular shape when viewed from the side facing the negative end of the Y direction. The protrusion 261 is provided with fixed legs 262.

The fixed legs 262 are provided at two corners of the protrusion 261 that face the negative end of the Z direction. The fixed legs 262 form one of contact portions in contact with the installation surface.

The step 263 is a portion of the bottom surface 26 that is not the protrusion 261, and is a noncontact portion that does not come into contact with the installation surface. Specifically, the step 263 is disposed at a position shifted toward the positive end of the Y direction from a surface 261A of the protrusion 261, at which the fixed legs 262 are provided, and is separate from the installation surface toward the positive end of the Y direction when the projector 1 is installed at the installation surface.

The step 263 is provided with first intake ports 264, a mesh 265, second intake ports 266, third intake ports 267, and an adjustable leg 268. That is, the exterior housing 2 has the first intake ports 264 and the mesh 265.

The first intake ports 264 are disposed at positions shifted from the protrusion 261 toward the negative end of the Z direction. That is, the first intake ports 264 are provided at positions on the bottom surface 26 that are shifted toward the rear surface 22. The first intake ports 264 are a plurality of openings arranged along the X-axis. When a first fan 51, which will be described later and is disposed in the exterior housing 2, is driven, the air outside the exterior housing 2 is introduced into the exterior housing 2 via the first intake ports 264. The step 263 has a configuration in which the portion where the first intake ports 264 are provided is continuous with the rear surface 22.

The mesh 265 is provided inside the exterior housing 2 in correspondence with the first intake ports 264, and captures dirt and dust contained in the outside air flowing through the first intake ports 264. The openings of the mesh 265 are rougher than those of the fabric 2C3 of the fabric unit 2C. The flow path resistance exerted on the outside air passing through the first intake ports 264 is therefore smaller than the flow path resistance exerted on the outside air passing through the communication ports 2CA1.

The second intake ports 266 are disposed at a portion of the bottom surface 26 that is shifted toward the positive end of the X direction and the positive end of the Z direction, and the third intake ports 267 are disposed at a portion of the bottom surface 26 that is shifted toward the negative end of the X direction and the positive end of the Z direction. Although not shown, the second intake ports 266 are provided with a sponge-like filter, and the third intake ports 267 are provided with a mesh.

The intake ports 264, 266, and 267 introduce the air outside the exterior housing 2 as the cooling gas into the exterior housing 2. The cooling gas introduced into the exterior housing 2 is caused to flow to cooling targets by fans 51, 54, and 55 of a cooling apparatus 5, which will be described later. The cooling gas having cooled the cooling targets is discharged out of the exterior housing 2 via the discharge ports 241 and 242.

The adjustable leg 268 is provided at a position sandwiched between the second intake ports 266 and the third intake ports 267 on the X-axis. The adjustable leg 268 is a leg capable of adjusting the amount of protrusion from the bottom surface 26, and is one of the contact portions that come into contact with the installation surface.

Configuration of Inclining Surface

The inclining surface 27 is provided as part of the lower case 2B so as to extend along the front surface 21, the rear surface 22, the right side surface 23, the left side surface 24, and the bottom surface 26. The inclining surface 27 includes a front inclining surface 27A, a rear inclining surface 27B, a right inclining surface 27C, and a left inclining surface 27D.

The front inclining surface 27A is formed of a portion of the front surface 21 that is shifted toward the negative end of the Y direction and a portion of the bottom surface 26 that is shifted toward the positive end of the Y direction. The front inclining surface 27A is a surface that extends along the front surface 21 and the bottom surface 26 and approaches the installation surface as extending toward the rear surface 22, which is opposite from the front surface 21. That is, a portion of the front inclining surface 27A that is shifted toward the negative end of the Y direction inclines with respect to the front surface 21, and a portion of the front inclining surface 27A that is shifted toward the positive end of the Y direction inclines with respect to the bottom surface 26.

The rear inclining surface 27B is formed of a portion of the rear surface 22 that is shifted toward the negative end of the Y direction and a portion of the bottom surface 26 that is shifted toward the positive end of the Y direction.

The right inclining surface 27C is formed of a portion of the right side surface 23 that is shifted toward the negative end of the Y direction and a portion of the bottom surface 26 that is shifted toward the positive end of the Y direction.

The left inclining surface 27D is formed of a portion of the left side surface 24 that is shifted toward the negative end of the Y direction and a portion of the bottom surface 26 that is shifted toward the positive end of the Y direction.

The rear inclining surface 27B, the right inclining surface 27C, and the left inclining surface 27D each incline as the front inclining surface 27A does.

Internal Configuration of Exterior Housing

Figure 5:
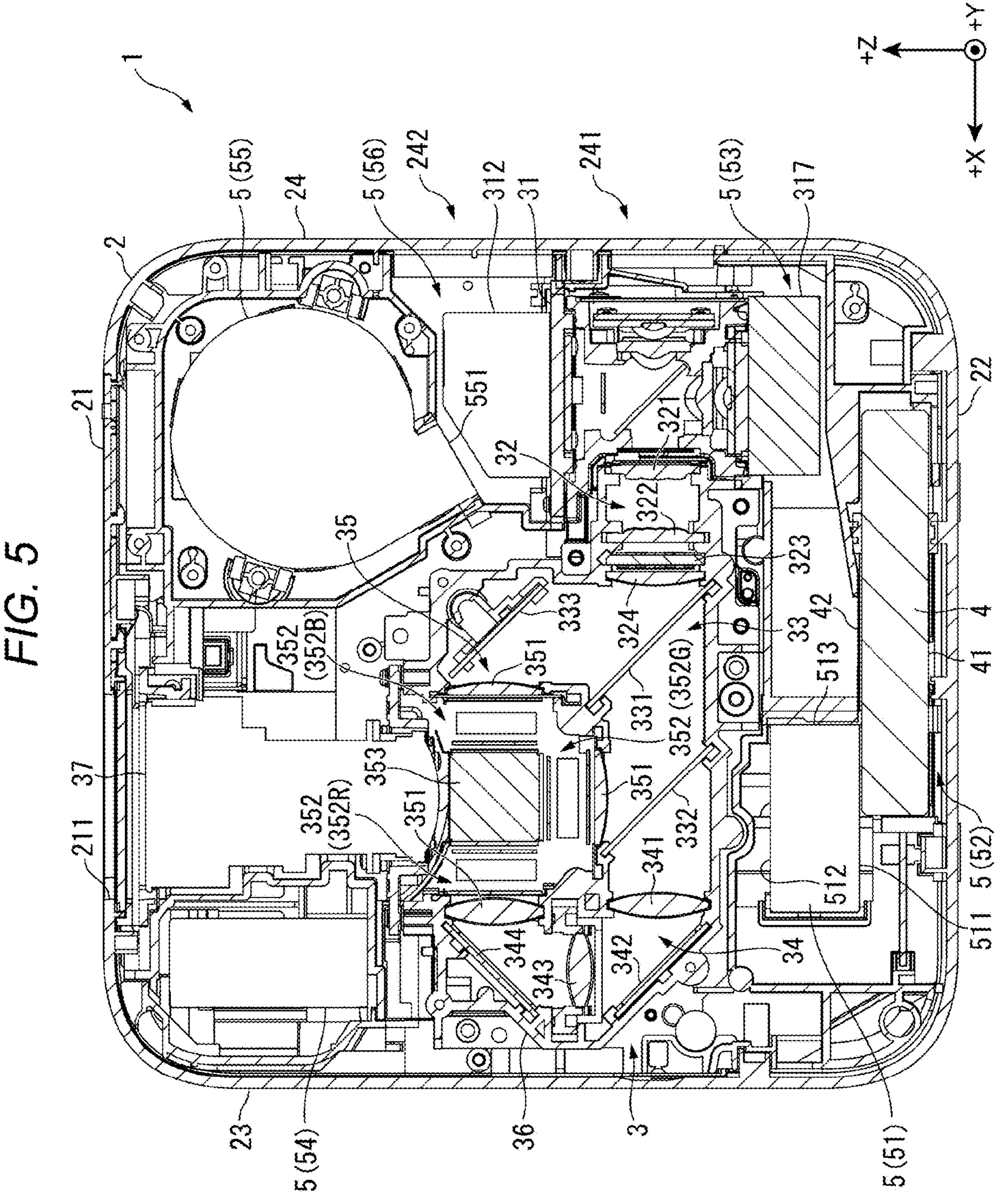
FIG. 5 is a cross-sectional view showing the projector according to the first embodiment.

FIG. 5 shows a cross section of the projector 1 taken along an XZ plane.

The projector 1 includes, in addition to the exterior housing 2, an image projection apparatus 3, a communication apparatus 4, and the cooling apparatus 5, which are disposed in a portion of the exterior housing 2 that is shifted toward the positive end of the Y direction, as shown in FIG. 5.

In addition, although not shown, the projector 1 includes a control substrate disposed at a position shifted toward the positive end of the Y direction from the image projection apparatus 3, the communication apparatus 4, and the cooling apparatus 5. The control substrate controls the operation of the projector 1.

Configuration of Image Projection Apparatus

The image projection apparatus 3 generates image light according to image information and projects the generated image light. The image projection apparatus 3 is provided substantially at the center of the exterior housing 2 and along the X-axis and the Z-axis. The image projection apparatus 3 includes a light source apparatus 31, a homogenizing system 32, a color separation system 33, a relay system 34, an image formation apparatus 35, an optical part housing 36, and a projection optical apparatus 37.

The light source apparatus 31 is provided at a position shifted toward the negative end of the X direction and located substantially at the center of the Z-axis in the exterior housing 2, and outputs illumination light toward the positive end of the X direction. The configuration of the light source apparatus 31 will be described later in detail.

The homogenizing system 32 homogenizes the illumination light output from the light source apparatus 31. The homogenized illumination light travels via the color separation system 33 and the relay system 34 and illuminates light modulation region of each light modulator 352, which will be described later. The homogenizing system 32 includes two lens arrays 321 and 322, a polarization converter 323, and a superimposing lens 324.

The color separation system 33 separates the illumination light incident from the homogenizing system 32 into red light, green light, and blue light. The color separation system 33 includes two dichroic mirrors 331 and 332 and a reflection mirror 333, which reflects the blue light separated by the dichroic mirror 331.

The relay system 34 is provided in the optical path of the red light, which is longer than the optical paths of the other color light, and suppresses loss of the red light. The relay system 34 includes a light-incident-side lens 341, a relay lens 343, reflection mirrors 342 and 344. Note that the blue light may be set as the color light having a longer optical path than those of the other color light, and the relay system 34 may be provided in the optical path of the blue light.

The image formation apparatus 35 modulates the red light, the green light, and the blue light incident thereon and combines the modulated three types of color light with one another to form the image light. That is, the image formation apparatus 35 modulates the illumination light output from the light source apparatus 31 to form the image light. The image formation apparatus 35 includes three field lenses 351 and three light modulators 352, which are provided in accordance with the incident three types of color light, and one light combiner 353.

The three light modulators 352 modulate the illumination light output from the light source apparatus 31 in accordance with the image information. The three light modulators 352 include a light modulator 352R, which modulates the red light, a light modulator 352G, which modulates the green light, and a light modulator 352B, which modulates the blue light. The light modulators 352 can be each formed, for example, of a liquid crystal panel and a pair of polarizing plates that sandwich the liquid crystal panel.

The light combiner 353 combines the three types of color light modulated by the light modulators 352B, 352G, and 352R with one another to form the image light and outputs the formed image light to the projection optical apparatus 37. In the present embodiment, the light combiner 353 is formed of a cross dichroic prism, but not necessarily, and can instead be formed, for example, of a plurality of dichroic mirrors.

The optical part housing 36 accommodates the homogenizing system 32, the color separation system 33, and the relay system 34.

The projection optical apparatus 37 is a projection lens that enlarges the image light incident from the image formation apparatus 35 and projects the enlarged image light onto the projection receiving surface. The projection optical apparatus 37 can, for example, be an assembled lens including a plurality of lenses and a tubular lens barrel that accommodates the plurality of lenses.

Configuration of Light Source Apparatus

Figure 6:
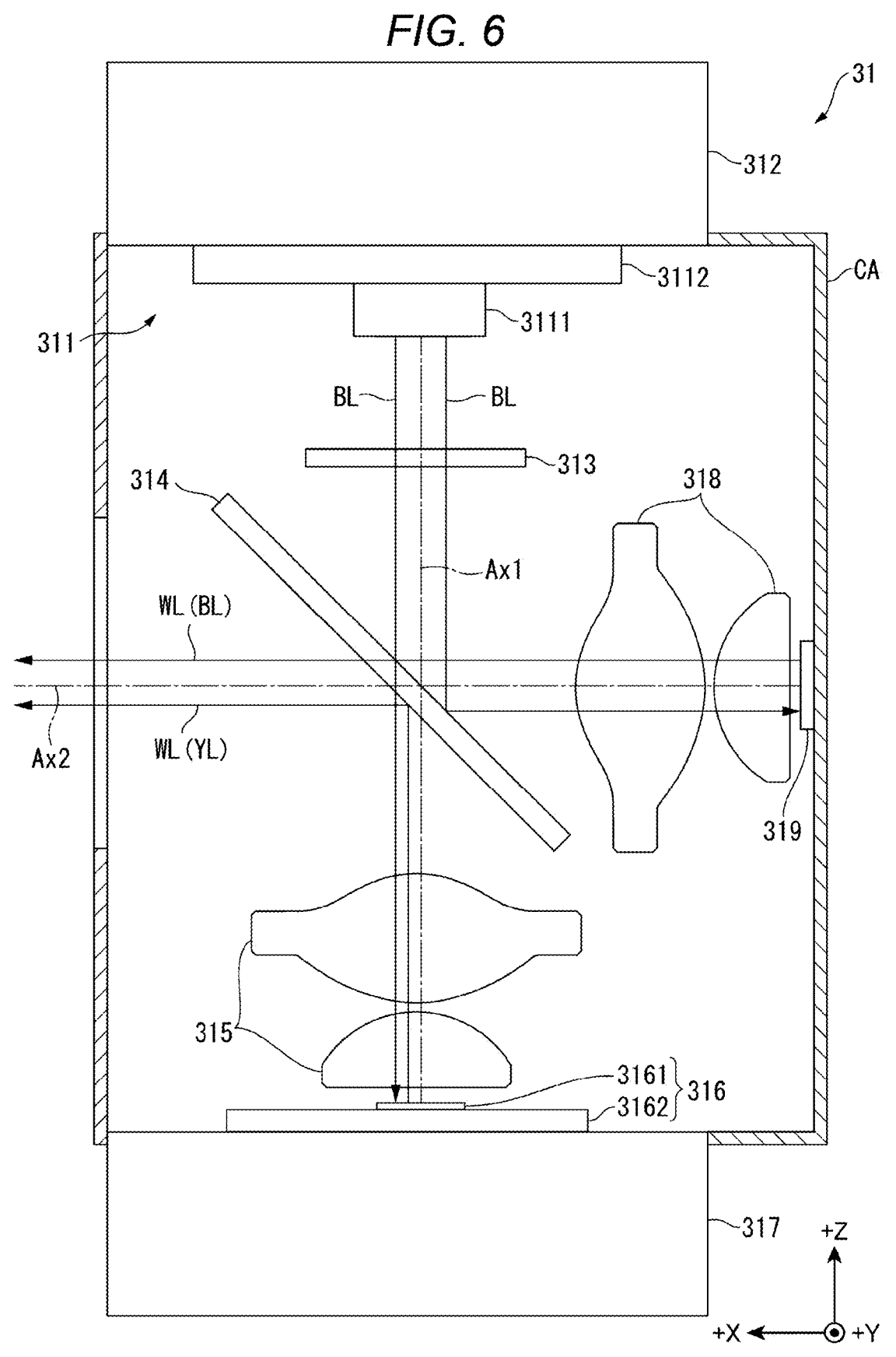

FIG. 6 is a diagrammatic view showing the configuration of the light source apparatus 31.

The light source apparatus 31 outputs illumination light WL, toward the homogenizing system 32 in the X direction toward the positive end thereof. The light source apparatus 31 includes a light source 311, a first heat dissipation member 312, a diffusively transmissive section 313, a light separator 314, a first light collector 315, a wavelength converter 316, a second heat dissipation member 317, a second light collector 318, a diffusive reflector 319, and a light source housing CA, as shown in FIG. 6.

The following axes are set in the light source apparatus 31: an optical axis Ax1 extending along the Z-axis; and an optical axis Ax2 perpendicular to the optical axis Ax1 and extending along the X-axis. The optical parts of the light source apparatus 31 are disposed on the optical axis Ax1 or the optical axis Ax2.

Specifically, the light source 311, the diffusively transmissive section 313, the light separator 314, the first light collector 315, and the wavelength converter 316 are disposed on the optical axis Ax1.

The diffusive reflector 319, the second light collector 318, and the light separator 314 are disposed on the optical axis Ax2. That is, the light separator 314 is disposed at the intersection of the optical axis Ax1 and the optical axis Ax2.

The optical axis Ax2 is linked to the optical axis of the image projection apparatus 3 at the lens array 321 of the homogenizing system 32.

Configuration of Light Source Housing

The light source housing CA accommodates the light source 311, the diffusively transmissive section 313, the light separator 314, the first light collector 315, the wavelength converter 316, the second light collector 318, and the diffusive reflector 319. In the present embodiment, the light source housing CA is a sealed housing that dirt and dust is unlikely to enter, but not necessarily. The light source housing CA only needs to accommodate the optical parts described above.

Configuration of Light Source

The light source 311 outputs light toward the negative end of the Z direction. The light source 311 includes a light emitter 3111 and a substrate 3112.

The light emitter 3111 emits blue light BL. The blue light BL is excitation light that excites a phosphor of the wavelength converter 316. The light emitter 3111 is a semiconductor laser that outputs laser light having a peak wavelength of 455 nm.

The substrate 3112 is fixed to the light source housing CA while supporting the light emitter 3111. The substrate 3112 receives heat from the light emitter 3111 and transfers the received heat to the first heat dissipation member 312. That is, the substrate 3112 functions as a support substrate that supports the light emitter 3111, and also functions as a heat receiving substrate that receives the heat from the light emitter 3111.

Configuration of First Heat Dissipation Member

The first heat dissipation member 312 is disposed in a third duct 56, which will be described later, of the cooling apparatus 5, and dissipates the heat transferred from the substrate 3112. The first heat dissipation member 312 transfers the heat of the light emitter 3111 transferred via the substrate 3112 to the cooling gas flowing from the third fan 55, which will be described later, to cool the light emitter 3111.

Configuration of Diffusively Transmissive Section

The diffusively transmissive section 313 diffuses the blue light BL incident from the light source 311 and outputs light having a homogenized illuminance distribution. The blue light BL output from the diffusively transmissive section 313 is incident on the light separator 314. The diffusively transmissive section 313 can, for example, have a configuration including a hologram, a configuration in which a plurality of lenslets are arranged in a plane perpendicular to the optical axis, or a configuration in which a light passage surface is a rough surface.

In place of the diffusively transmissive section 313, the light source apparatus 31 may employ a homogenizer optical element including a pair of multi-lens arrays. On the other hand, when the diffusively transmissive section 313 is employed, the distance from the light source 311 to the light separator 314 can be reduced as compared with the case where the homogenizer optical element is employed.

Configuration of Light Separator

The light separator 314 has the function of a half-silvered mirror that transmits part of the blue light BL incident thereon from the light source 311 via the diffusively transmissive section 313 and reflects the remainder of the blue light BL. That is, the light separator 314 transmits first partial light that is part of the blue light BL incident from the diffusively transmissive section 313 toward the negative end of the Z direction to cause the transmitted light to enter the first light collector 315, and reflects second partial light that is the remainder of the blue light BL toward the negative end of the X direction to cause the reflected light to enter the second light collector 318.

The light separator 314 further has the function of a dichroic mirror that reflects fluorescence YL incident from the wavelength converter 316 in the Z direction toward the positive end thereof and transmits the blue light BL incident from the diffusive reflector 319 in the X direction toward the positive end thereof.

Configuration of First Light Collector

The first light collector 315 causes the first partial light having passed through the light separator 314 to be collected at the wavelength converter 316. Furthermore, the first light collector 315 parallelizes the fluorescence YL incident from the wavelength converter 316.

Configuration of Wavelength Converter

The wavelength converter 316 is a reflective wavelength converter that converts the wavelength of the light incident thereon, diffuses the converted light in the opposite direction of the direction of the incident light, and outputs the diffused light. The wavelength converter 316 includes a phosphor layer 3161 and a substrate 3162, and is directly or indirectly fixed to the light source housing CA.

The phosphor layer 3161 contains a phosphor excited by the blue light BL incident thereon, which is excitation light, and emits the fluorescence YL having wavelengths longer than the wavelength of the incident blue light BL. The light output from the phosphor layer 3161 is the fluorescence YL, which is non-polarized light and has peak wavelengths ranging, for example, from 500 to 700 nm, and the fluorescence YL contains green light and red light.

The substrate 3162 supports the phosphor layer 3161 and receives heat the phosphor layer 3161. Although not shown, a reflective layer that reflects the light incident from the phosphor layer 3161 is provided between the phosphor layer 3161 and the substrate 3162.

The fluorescence YL output from the wavelength converter 316 passes through the first light collector 315 along the optical axis Ax1 and is incident on the light separator 314. The fluorescence YL incident on the light separator 314 is reflected off the light separator 314 toward the positive end of the X direction, and exits out of the light source apparatus 31 along the optical axis Ax2.

Configuration of Second Heat Dissipation Member

The second heat dissipation member 317 is disposed in a second duct 53, which will be described later, and dissipates the heat transferred from the substrate 3162. The second heat dissipation member 317 transfers the heat of the phosphor layer 3161 transferred via the substrate 3162 to the cooling gas flowing from the first fan 51, which will be described later, to cool the wavelength converter 316.

Configuration of Second Light Collector

The second light collector 318 causes the second partial light incident from the light separator 314 to be collected at the diffusive reflector 319. The second light collector 318 parallelizes the blue light incident from the diffusive reflector 319.

Configuration of Diffusive Reflector

The diffusive reflector 319 is fixed to the inner surface of the light source housing CA. The diffusive reflector 319 diffusively reflects the blue light BL incident from the second light collector 318 at the diffusion angle substantially equal to the diffusion angle of the fluorescence YL output from the wavelength converter 316 or the diffusion angle slightly smaller than the diffusion angle of the fluorescence YL. That is, the diffusive reflector 319 diffusively reflects the light incident thereon without converting the wavelength of the incident light.

The blue light BL reflected off the diffusive reflector 319 toward the positive end of the X direction passes through the second light collector 318, then passes through the light separator 314 toward the positive end of the X direction, and exits out of the light source apparatus 31 along with the fluorescence YL.

As described above, the illumination light WL, which exits out of the light source apparatus 31, is white light that is the mixture of the blue light BL and the fluorescence YL containing green light and red light.

Configuration of Communication Apparatus

The communication apparatus 4 shown in FIG. 5 is electrically coupled to the control substrate described above, and wirelessly communicates with an external device that is not shown, for example, a video output apparatus. In detail, the communication apparatus 4 receives a video signal from the video output apparatus and outputs the received video signal to a control substrate.

The communication apparatus 4 is formed in a rectangular box-like shape, and is so disposed inside the exterior housing 2 along the rear surface 22 that the longitudinal direction of the communication apparatus 4 extends along the X-axis. The communication apparatus 4 is cooled by the cooling gas caused to flow by the first fan 51, which will be described later.

Configuration of Cooling Apparatus

The cooling apparatus 5 cools the cooling targets that constitute the projector 1. The cooling apparatus 5 includes the first fan 51, a first duct 52, the second duct 53, the second fan 54, the third fan 55, and the third duct 56. The first fan 51, the first duct 52, the second duct 53, the second fan 54, the third fan 55, and the third duct 56 are each provided inside the exterior housing 2.

Configuration of First Fan

The first fan 51 is a double-sided-intake sirocco fan including intake sections 511 and 512 and a sending section 513. The first fan 51 is disposed adjacent to the communication apparatus 4 in the Z direction toward the positive end thereof with respect to the communication apparatus 4 in such a way that the intake section 511 faces the negative end of the Z direction, the intake section 512 faces the positive end of the Z direction, and the sending section 513 faces the negative end of the X direction.

The first fan 51 causes the cooling gas introduced into the exterior housing 2 to flow to first and second cooling targets to cool the cooling targets. Specifically, the first fan 51 sucks the cooling gas flowing through the first duct 52 and causes the cooling gas to flow to the communication apparatus 4 as the first cooling target and the second heat dissipation member 317 coupled in a heat transferable manner to the wavelength converter 316 as the second cooling target to cool the communication apparatus 4 and the wavelength converter 316.

The cooling gas sucked by the first fan 51 will be described later in detail.

Configuration of First Duct

The first duct 52 is a duct through which the first fan 51 takes in the air, and causes the cooling gas introduced into the exterior housing 2 via the first intake ports 264 and the communication ports 2CA1 to flow to the first fan 51. That is, the first duct 52 causes the first fan 51 to communicate with the communication ports 2CA1 and the first intake ports 264, and the first fan 51 sucks the air outside the exterior housing 2 through the first duct 52.

The first duct 52 is formed by the inner surface of the rear surface 22 of the exterior housing 2 and the speaker unit 6, which will be described later. Part of the cooling gas having flowed through the first duct 52 flows along the communication apparatus 4 to cool the communication apparatus 4 before sucked into the first fan 51. For example, the cooling gas flows along a surface 41 of the communication apparatus 4, which is the surface facing the negative end of the Z direction.

Configuration of Second Duct

The second duct 53 is a duct through which the first fan 51 exhausts the air, and couples the sending section 513 of the first fan 51 to the discharge ports 241. A surface 42 of the communication apparatus 4, which the surface facing the positive end of the Z direction, is exposed to the interior of the second duct 53, and the second heat dissipation member 317 is disposed in the second duct 53. The cooling gas sent from the first fan 51 toward the negative end of the X direction flows through the second duct 53 toward the negative end of the X direction to cool the communication apparatus 4, and then flows to the second heat dissipation member 317 to cool the second heat dissipation member 317. The cooling gas having cooled the second heat dissipation member 317 flows through the second duct 53 and is discharged out of the exterior housing 2 via the discharge ports 241.

Configuration of Second Fan

The second fan is provided inside the exterior housing 2 at the corner facing the positive end of the X direction and the positive end of the Z direction. The second fan 54 sucks the air outside the exterior housing 2 as the cooling gas via the second intake ports 266, and sends the sucked cooling gas to the optical modulators 352 and the control substrate, the latter of which is disposed at a position shifted from the image projection apparatus 3 toward the positive end of the Y direction.

The cooling gas sent by the second fan 54 causes the portion where the image projection apparatus 3 and the control substrate are disposed inside the exterior housing 2 to have a positive pressure. On the other hand, although not shown in detail, the space shifted from the control substrate toward the positive end of the Y direction communicates with the discharge ports 241.

Therefore, the cooling gas having cooled the image formation apparatus 35, which includes the light modulators 352, and the control substrate is pushed out by the positive pressure toward the discharge ports 241, and drawn by the flow of the cooling gas flowing through the second duct 53 and discharged via the discharge ports 241, so that the cooling gas is discharged out of the exterior housing 2 via the discharge ports 241.

Configurations of Third Fan and Third Duct

The third fan 55 is provided inside the exterior housing 2 at the corner facing the negative end of the X direction and the positive end of the Z direction. The third fan 55 sucks the air outside the exterior housing 2 as the cooling gas via the third intake ports 267, and sends the sucked cooling gas to the first heat dissipation member 312. An air sending port 551 of the third fan 55 opens into the third duct 56.

The cooling gas sent from the third fan 55 flows through the third duct 56, which couples the air sending port 551 of the third fan 55 to the discharge ports 242, which open through the left side surface 24. Since the first heat dissipation member 312 is disposed in the third duct 56, the cooling gas sent from the third fan 55 into the third duct 56 cools the first heat dissipation member 312 as described above, and is then discharged out of the exterior housing 2 via the discharge ports 242.

Configuration of Speaker Unit

Figure 7:
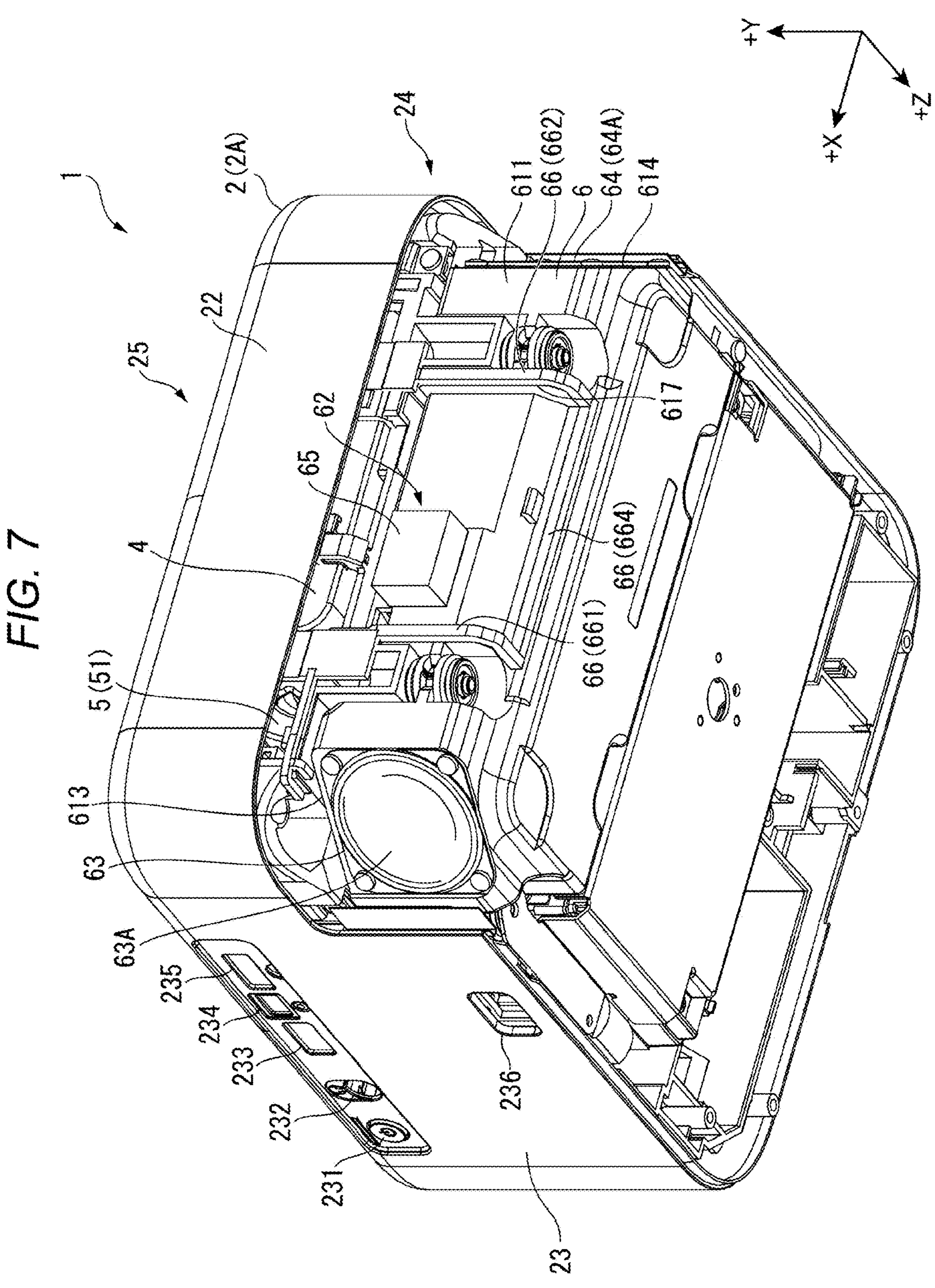
FIG. 7 is a perspective view showing the projector according to the first embodiment with the fabric unit and a lower case removed.
Figure 8:
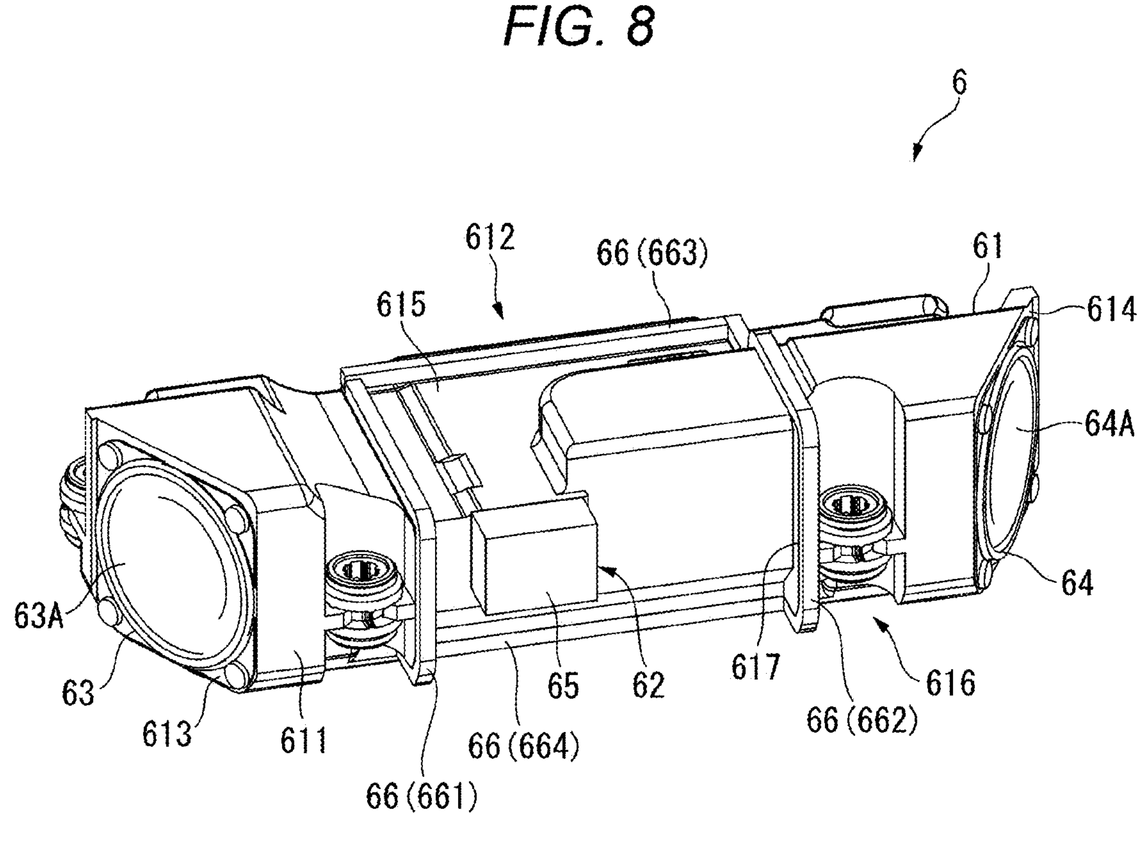
FIG. 8 is a perspective view showing a speaker unit according to the first embodiment.
Figure 8:
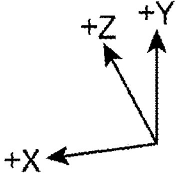

FIG. 7 is a perspective view of the projector 1 viewed from the side facing the rear surface thereof with the lower case 2B and the fabric unit 2C removed. FIG. 8 is a perspective view showing the speaker unit 6, and FIG. 9 is a plan view showing the speaker unit 6 viewed from the side facing the positive end of the Y direction.

In addition to the configuration described above, the projector 1 further includes the speaker unit 6, which is a speaker apparatus disposed in the exterior housing 2, as shown in FIG. 7.

The speaker unit 6 is disposed in a portion of the exterior housing 2 that is shifted toward the negative end of the Y direction and the negative end of the Z direction, and outputs voice according to a voice signal input from the control substrate. In addition, the speaker unit 6, which is disposed in the exterior housing 2, constitutes, along with the inner surface of the rear surface 22, the first duct 52.

Figure 9:
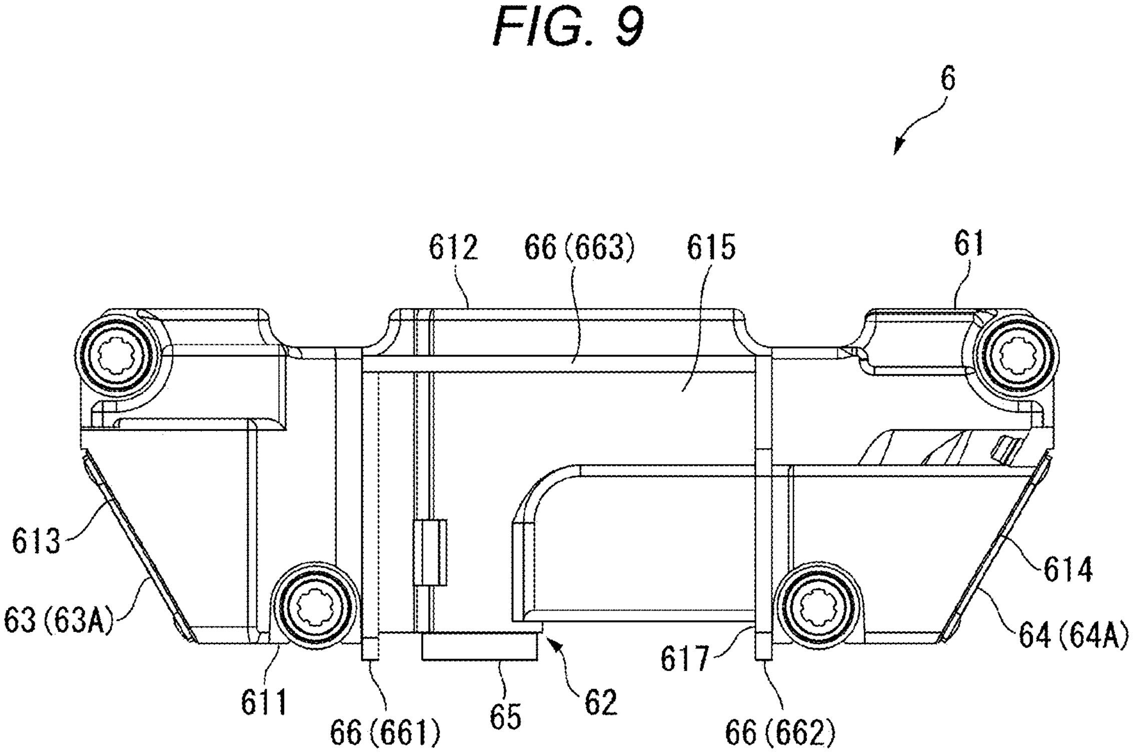
FIG. 9 is a plan view showing the speaker unit according to the first embodiment.
Figure 9:
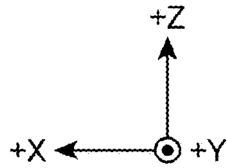

The speaker unit 6 includes a speaker housing 61, a first sound emitter 62, second sound emitters 63 and 64, a porous member 65, and a sealer 66, as shown in FIGS. 7 to 9.

The speaker housing 61 is an enclosure that supports the first sound emitter 62, the second sound emitters 63 and 64, the porous member 65, and the sealer 66. The speaker housing 61 has a first surface 611, a second surface 612, a third surface 613, a fourth surface 614, a fifth surface 615, and a sixth surface 616, and is formed in a lateral truncated quadrangular pyramidal shape, as shown in FIGS. 8 and 9. That is, the speaker housing 61 is so shaped that the dimension thereof along the X-axis decreases as the speaker housing 61 extends toward the negative end of the Z direction.

The first surface 611 is a surface facing the negative end of the Z direction and opposes the inner surface of the rear surface section 2CA of the fabric unit 2C. That is, the first surface 611 opposes the surface of the rear surface section 2CA that is opposite from the fabric 2C3 of the frame 2C1. The thus configured first surface 611 opposes the communication ports 2CA1 of the rear surface section 2CA.

The first surface 611 is provided with a recess 617, which is recessed toward the positive end of the Z direction. That is, the speaker housing 61 has the recess 617. As will be described later in detail, the recess 617 widens the flow path through which the cooling gas introduced into the exterior housing 2 via the first intake ports 264 flows.

The second surface 612 is a surface opposite from the first surface 611.

The third surface 613 is a surface facing the positive end of the X direction and the negative end of the Z direction. That is, the third surface 613 is an inclining surface inclining with respect to each of the XY plane and the YZ plane.

The fourth surface 614 is a surface facing the negative end of the X direction and the negative end of the Z direction. That is, the fourth surface 614 is an inclining surface inclining with respect to each of the XY plane and the YZ plane.

The fifth surface 615 is a surface that faces the positive end of the Y direction and opposes the communication apparatus 4 and the first fan 51.

The sixth surface 616 is a surface that faces the negative end of the Y direction and opposes the inner surface of the bottom surface 26. That is, the fifth surface 615 opposes the first intake ports 264.

The thus configured speaker housing 61 is disposed so as to oppose the communication ports 2CA1 and the first intake ports 264.

Figure 10:
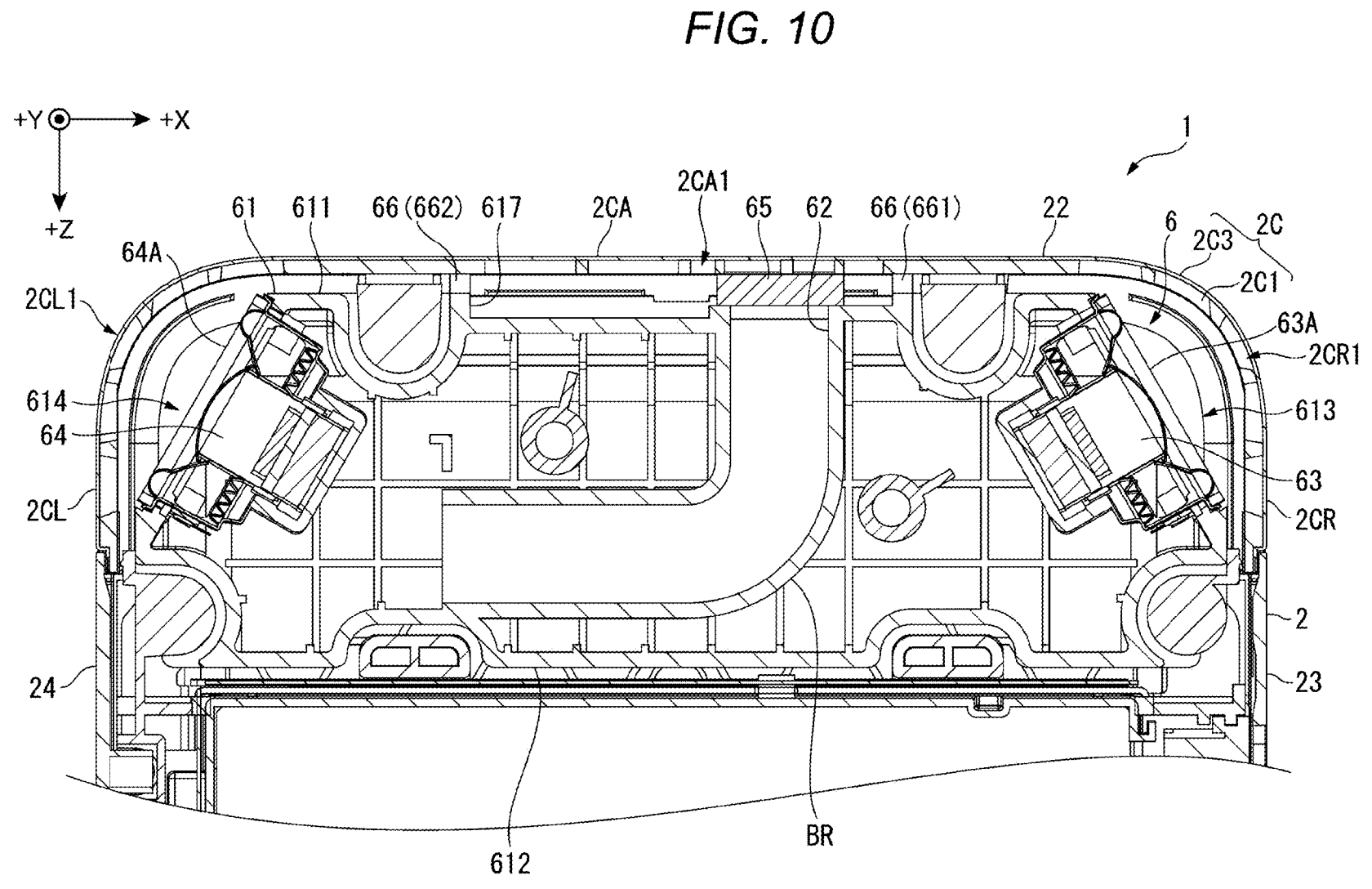

FIG. 10 shows a cross section of the first sound emitter 62 of the projector 1 taken along an XZ plane. That is, FIG. 10 is a cross-sectional view showing the projector 1 in which the speaker unit 6 is disposed.

The first sound emitter 62 is provided at the first surface 611. In detail, the first sound emitter 62 is disposed at the bottom of the recess 617. The first sound emitter 62 is the exit-side port of a bass reflex duct BR provided in the speaker housing 61, as shown in FIG. 10. The first sound emitter 62 therefore outputs a low-pitched sound. The entrance-side port of the bass reflex duct BR is disposed in the speaker housing 61.

The speaker housing 61 is provided with the porous member 65, which covers at least part of the first sound emitter 62, as shown in FIGS. 7 to 10. In the present embodiment, the porous member 65 is provided so as to cover the entire first sound emitter 62 when viewed from the side facing the negative end of the Z direction.

The porous member 65 reduces the flow speed of the air flowing through the bass reflex duct BR at the exit-side port. The thus configured porous member 65 slows down the flow of air coming out of the bass reflex duct BR to reduce port noise and wind noise generated at the exit-side port.

The porous member 65 is in contact with the inner surface of the fabric unit 2C. The porous member 65 thus suppresses noise generated due to vibration of the fabric unit 2C caused by the low-pitched sound emitted from the first sound emitter 62. The porous member 65 can be made, for example, of sponge.

The second sound emitters 63 and 64 each emit voice according to the voice signal input from the control substrate. The second sound emitters 63 and 64 are each a full-range speaker, and can emit a higher-pitched sound than the sound emitted from the first sound emitter 62. That is, the second sound emitters 63 and 64 can each emit a sound different in terms of pitch from the sound emitted from the first sound emitter 62.

The second sound emitter 63 is provided at the third surface 613, and a sound emission surface 63A, via which the second sound emitter 63 emits the sound, faces the positive end of the X direction and the negative end of the Z direction, as shown in FIG. 10. The sound emitted from the second sound emitter 63 exits out of the exterior housing 2 via the right sound emission ports 2CR1 and the fabric 2C3 of the fabric unit 2C.

The second sound emitter 64 is provided at the fourth surface 614, as shown in FIGS. 8 and 9, and a sound emission surface 64A, via which the second sound emitter 64 emits the sound, faces the negative end of the X direction and the negative end of the Z direction, as shown in FIG. 10.

The sound emitted from the second sound emitter 64 exits out of the exterior housing 2 via the left sound emission ports 2CL1 and the fabric 2C3 of the fabric unit 2C.

Arranging the second sound emitters 63 and 64 as described above allows effective spread of the sound outside the exterior housing 2.

The sealer 66 is provided between the inner surface of the fabric unit 2C, which constitutes the exterior housing 2, and the speaker housing 61, and seals the space between the inner surface of the fabric unit 2C and the outer surface of the speaker housing 61. In the present embodiment, the sealer 66 is fixed to the speaker housing 61 with an adhesive or a double-sided adhesive tape.

In detail, the sealer 66 is provided across the first surface 611, the fifth surface 615, and the sixth surface 616. The sealer 66 is provided between the speaker housing 61 and the inner surface of the exterior housing 2, and surrounds the first sound emitter 62 to separate the space in which the first sound emitter 62 is disposed from the space in which the second sound emitters 63 and 64 are disposed. That is, the sealer 66 separates the second sound emitters 63 and 64 from the airflow that the first fan 51 causes to flow through the space in which the first sound emitter 62 is disposed.

The sealer 66 includes a first sealer 661, a second sealer 662, a third sealer 663, and a fourth sealer 664, as shown in FIG. 8. The sealer 66 has the shape of a frame formed by the sealers 661 to 664 coupled to each other.

The first sealer 661 and the second sealer 662 are provided across the first surface 611, the fifth surface 615, and the sixth surface 616 in the speaker housing 61. The first sealer 661 is disposed between the first sound emitter 62 and the second sound emitter 63 along the X-axis, and the second sealer 662 is disposed between the first sound emitter 62 and the second sound emitter 64 along the X-axis. In the present embodiment, the first intake ports 264 open to the space between the first sealer 661 and the second sealer 662. The sealers 661 and 662 therefore prevent the outside air introduced into the exterior housing 2 via the first intake ports 264 from flowing to the second sound emitters 63 and 64.

The third sealer 663 is provided along the X-axis at a portion of the fifth surface 615 that faces the positive end of the Z direction. The first sealer 661 and the second sealer 662 are each coupled to the third sealer 663.

The fourth sealer 664 is provided along the X-axis at a portion of the sixth surface 616 that faces the positive end of the Z direction. The first sealer 661 and the second sealer 662 are each coupled to the fourth sealer 664.

Flow of Cooling Gas Introduced Via First Intake Port

Figure 11:
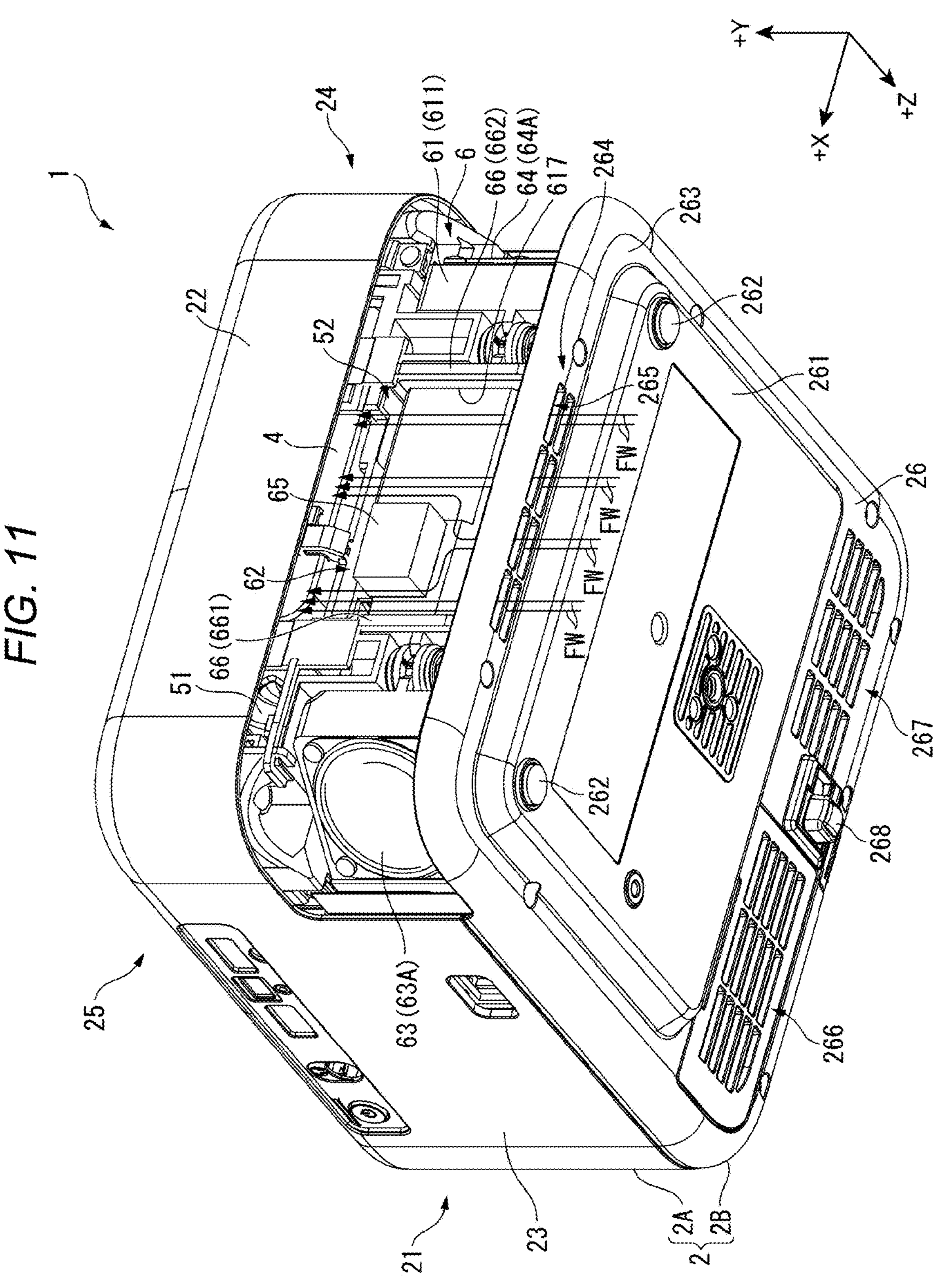
FIG. 11 describes the flow of a cooling gas introduced into an exterior housing via first intake ports according to the first embodiment.
Figure 12:
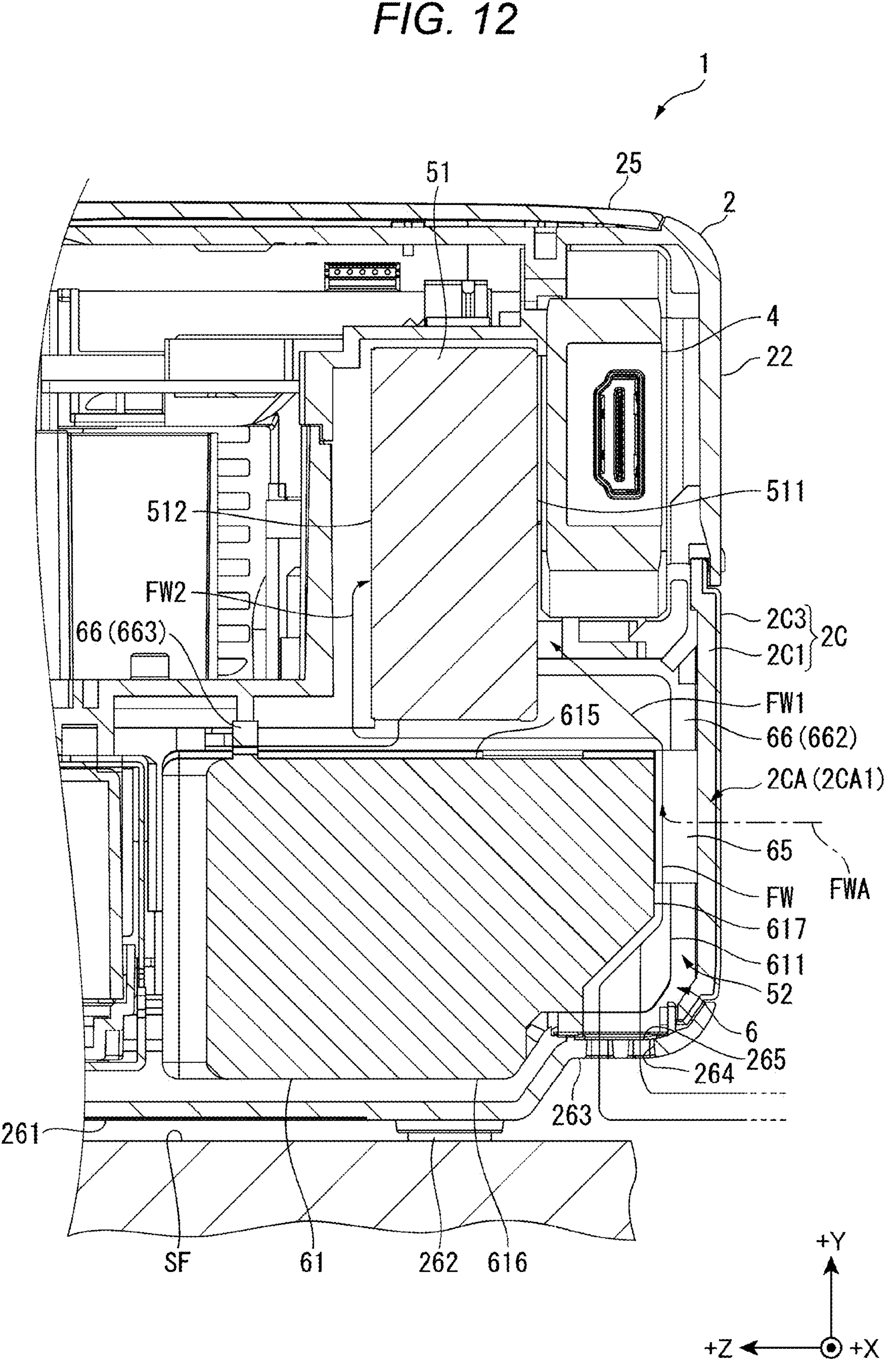
FIG. 12 describes the flow of the cooling gas introduced into the exterior housing via the first intake ports according to the first embodiment.

FIGS. 11 and 12 describe the flow of the cooling gas introduced into the exterior housing 2 via the first intake ports 264. In other words, FIG. 11 is a perspective view of the projector 1 viewed from the side facing the rear surface thereof, and FIG. 12 is a cross-sectional view of the projector 1 taken along a YZ plane. Note in FIG. 11 that the fabric unit 2C is not shown to show the air flow in the exterior housing 2.

When the first fan 51 is driven, the air outside the exterior housing 2 is introduced as a cooling gas FW into the exterior housing 2 via the first intake ports 264 separate from an installation surface SF, as shown in FIGS. 11 and 12.

The cooling gas FW introduced into the exterior housing 2 via the first intake ports 264 flows toward the positive end of the Y direction through the first duct 52, which is formed by the first sealer 661, the second sealer 662, the first surface 611 of the speaker housing 61, and the inner surface of the fabric unit 2C. The recess 617, which is recessed toward the positive end of the Z direction, is provided between the first sealer 661 and the second sealer 662, and the first sound emitter 62 is provided at the bottom of the recess 617, as described above.

The cooling gas flowing through the first duct 52 further flows toward the positive end of the Y direction while detouring the porous member in 65 provided correspondence with the first sound emitter 62. The cooling gas FW1, which is part of the cooling gas FW having flowed toward the positive end of the Y direction, is sucked by the intake section 511 of the first fan 51. The cooling gas FW2, which is the remainder of the cooling gas FW having flowed toward the positive end of the Y direction, flows between the first fan 51 and the fifth surface 615 toward the positive end of the Z direction, and is sucked by the intake section 512 of the first fan 51.

The cooling gas sucked by the first fan 51 is sent to the second duct 53, cools the communication apparatus 4 and the second heat dissipation member 317, and is then discharged out of the exterior housing 2 via the discharge ports 241, as described above.

How Cooling Gas Flows when First Intake Ports are Closed

In the state in which the projector 1 is normally installed, the flow path resistance exerted on the cooling gas by the communication ports 2CA1, which form the sound emission port of the first sound emitter 62, is greater than the flow path resistance exerted on the cooling gas by the first intake ports 264. In this state, the air outside the exterior housing 2 is introduced into the exterior housing 2 via the first intake ports 264 in preference to the communication ports 2CA1.

On the other hand, when the first intake ports 264 are blocked by an obstacle or any other object, so that the flow path resistance exerted on the cooling gas by the first intake ports 264 becomes greater than the flow path resistance exerted on the cooling gas by the communication ports 2CA1, the air outside the exterior housing 2 is introduced into the exterior housing 2 as a cooling gas FWA via the communication ports 2CA1 and flows through the first duct 52, as shown in FIG. 12. The introduction of the outside air into the exterior housing 2 is thus maintained.

Effects of First Embodiment

The projector 1 according to the present embodiment described above provides the effects below.

The projector 1 includes the exterior housing 2, the first fan 51, and the speaker unit 6. The first fan 51 is a fan provided inside the exterior housing 2. The speaker unit 6 includes the speaker housing 61 and the first sound emitter 62 provided in the speaker housing 61.

The exterior housing 2 has the front surface 21, the rear surface 22, the right side surface 23, the left side surface 24, the top surface 25, and the bottom surface 26.

The front surface 21 and the rear surface 22 are provided so as to be opposite from each other along the Z-axis. The rear surface 22 has the communication ports 2CA1, which cause the interior and the exterior of the exterior housing 2 to communicate with each other and therefore serve as sound emission ports of the first sound emitter 62. The rear surface 22 corresponds to the first wall, the front surface 21 corresponds to the second wall, and the Z-axis corresponds to a first axis.

The right side surface 23 and the left side surface 24 are provided so as to be opposite from each other along the X-axis perpendicular to the Z-axis. One of the right side surface 23 and the left side surface 24 corresponds to the third wall, the other corresponds to the fourth wall, and the X-axis corresponds to a second axis.

The top surface 25 and the bottom surface 26 are provided so as to be opposite from each other along the Y-axis perpendicular to the X-axis and the Z-axis. The bottom surface 26 corresponds to the fifth wall, the top surface 25 corresponds to the sixth wall, and the Y-axis corresponds to a third axis.

The bottom surface 26 includes the fixed legs 262, the adjustable leg 268, the step 263, and the first intake ports 264.

The fixed legs 262 and the adjustable leg 268 are the contact portions that come into contact with the installation surface at which the projector 1 is installed.

The step 263 is the noncontact portion that does not come into contact with the installation surface.

The first intake ports 264 are provided at the step 263, and the flow path resistance exerted by the first intake ports 264 is smaller than the flow path resistance exerted by the communication ports 2CA1. The step 263 has a configuration in which the portion where the first intake ports 264 are provided is continuous with the rear surface 22.

The speaker housing 61 is disposed so as to oppose each of the communication ports 2CA1 and the first intake ports 264.

The first fan 51 communicates with the communication ports 2CA1 and the first intake ports 264, and sucks the air outside the exterior housing 2.

According to the configuration described above, the air outside the exterior housing 2 flows to the first fan 51 disposed inside the exterior housing 2 via the first intake ports 264 exerting a flow path resistance smaller than the flow path resistance exerted by the communication ports 2CA1, which serve as the sound emission port of the first sound emitter 62. The air outside the exterior housing 2 is therefore unlikely to flow through the communication ports 2CA1, so that a situation in which the communication ports 2CA1 are blocked by dirt and dust contained in the outside air can be avoided. The quality of the sound emitted from the first sound emitter 62 and passing through the communication ports 2CA1 can thus be maintained.

On the other hand, when the first intake ports 264 are blocked by an obstacle or any other object, the outside air is allowed to flow into the exterior housing 2 via the communication ports 2CA1. A decrease in the efficiency at which the cooling targets are cooled by the cooling gas caused to flow by the first fan 51 can therefore be suppressed. In addition, it is not necessary to separately provide an outside air intake port via which the outside air is taken in in an emergency. Therefore, the configuration described above can suppress the complication of the configuration of the projector 1, and contribute to reduction in the size of the projector 1.

In the projector 1, the step 263 serving as the noncontact portion is provided at a level shifted toward the positive end of the Y direction from the contact sections of the fixed legs 262 and the adjustable leg 268 that come into contact with the installation surface. That is, the step 263 is provided at a level shifted toward the top surface 25 from the contact sections.

The configuration described above can prevent the first intake ports 264 provided at the step 263 from being blocked by the installation surface. The air outside the exterior housing 2 can therefore be introduced into the exterior housing 2 via the first intake ports 264.

In the projector 1, the contact portions that come into contact with the installation surface are the fixed legs 262 and the adjustable leg 268, which protrude from the bottom surface 26. The fixed legs 262 and the adjustable leg 268 are legs.

According to the configuration described above, when the projector 1 is installed at the installation surface, the fixed legs 262 and the adjustable leg 268 come into contact with the installation surface, so that a gap is created between the installation surface and the bottom surface 26. The step 263 can therefore be separate from the installation surface, so that the separation can prevent the first intake ports 264 from being blocked by the installation surface. The air outside the exterior housing 2 can therefore be introduced into the exterior housing 2 via the first intake ports 264.

The projector 1 includes the sealer 66 provided between the inner surface of the exterior housing 2 and the speaker housing 61. The speaker unit 6 includes the second sound emitters 63 and 64, which are provided in the speaker housing 61 and output different pitched sounds from the sound emitted from the first sound emitter 62.

The sealer 66 separates the airflow flowing to the first fan 51 from the second sound emitters 63 and 64.

The fabric unit 2C of the exterior housing 2 includes the right sound emission ports 2CR1 as the sound emission port of the second sound emitter 63 and the left sound emission ports 2CL1 as the sound emission port of the second sound emitter 64.

According to the configuration described above, the airflow flowing to the first fan 51 is unlikely to flow to the second sound emitters 63 and 64. The influence of the airflow on the sounds emitted from the second sound emitters 63 and 64 can therefore be suppressed. A decrease in the quality of the sounds emitted from the second sound emitters 63 and 64 can therefore be suppressed.

In the projector 1, the second sound emitters 63 and 64 can output higher-pitched sounds than the sound output from the first sound emitter 62.

When the airflow flows in a direction that intersects with the propagation direction of the high-pitched sound, the sound is muffled and other effects occur, so that the sound quality decreases.

In contrast, the sealer 66 prevents the airflow flowing to the first fan 51 from flowing to the second sound emitters 63 and 64, so that a decrease in the quality of the high-pitched sound emitted from the second sound emitters 63 and 64 can be suppressed. The projector 1 can therefore emit a high-quality sound.

In the projector 1, the speaker housing 61 has the recess 617 at the first surface 611, which opposes the inner surface of the rear surface 22. The first surface 611 corresponds to an opposing surface.

The first sound emitter 62 is provided at the recess 617.

The airflow flowing to the first fan 51 flows to the recess 617.

According to the configuration described above, the recess 617 provided in the speaker housing 61 allows an increase in the distance between the first surface 611 of the speaker housing 61 and the inner surface of the rear surface 22. The flow path of the airflow flowing between the first surface 611 and the inner surface of the rear surface 22 can therefore be widened. Therefore, the airflow is allowed to efficiently flow to the first fan 51, and generation of wind noise and other noise can be suppressed.

In the projector 1, the exterior housing 2 includes the mesh 265 provided at the first intake ports 264.

According to the configuration described above, the mesh 265 can prevent dirt and dust from entering the exterior housing 2 via the first intake ports 264.

In the projector 1, the speaker unit 6 includes the porous member 65, which covers at least part of the first sound emitter 62.

According to the configuration described above, the airflow flowing from the first intake ports 264 toward the first fan 51 flows while detouring the porous member 65. The influence of the airflow on the sound emitted from the first sound emitter 62 can therefore be suppressed.

The sound emitted from the first sound emitter 62 is a low-pitched sound. Therefore, when the directivity of the sound is low and the distance from the first sound emitter 62 to the inner surface of the rear surface 22 is short, vibration of the rear surface 22 may generate noise.

In contrast, providing the porous member 65 can suppress vibration of the rear surface 22, and generation of noise.

In the projector 1, the speaker unit 6 includes the bass reflex duct BR and the porous member 65. The bass reflex duct BR has an entrance-side port disposed in the speaker housing and an exit-side port serving as the first sound emitter 62. The porous member 65 is provided at a position where the porous member 65 covers the exit-side port.

According to the configuration described above, the porous member 65 reduces the flow speed of the air flowing through the bass reflex duct BR and output via the exit-side port, so that port noise and wind noise generated at the exit-side port can be reduced.

The projector 1 includes the exterior housing 2, the first fan 51, and the speaker unit 6. The first fan 51 is a fan provided inside the exterior housing 2. The speaker unit 6 includes the speaker housing 61, the first sound emitter 62 provided in the speaker housing 61, and the second sound emitters 63 and 64 capable of emitting higher-pitched sounds than the sound emitted from the first sound emitter 62.

The projector 1 further includes the sealer 66, which constitutes the speaker unit 6. The sealer 66 is provided inside the exterior housing 2.

The exterior housing 2 has the front surface 21, the rear surface 22, the right side surface 23, the left side surface 24, the top surface 25, and the bottom surface 26.

The front surface 21 and the rear surface 22 are provided so as to be opposite from each other along the Z-axis. The rear surface 22 has the communication ports 2CA1, which cause the interior and the exterior of the exterior housing 2 to communicate with each other and therefore serve as sound emission ports of the first sound emitter 62. The rear surface 22 corresponds to the first wall, the front surface 21 corresponds to the second wall, and the Z-axis corresponds to a first axis.

The right side surface 23 and the left side surface 24 are provided so as to be opposite from each other along the X-axis perpendicular to the Z-axis. One of the right side surface 23 and the left side surface 24 corresponds to the third wall, the other corresponds to the fourth wall, and the X-axis corresponds to a second axis.

The top surface 25 and the bottom surface 26 are provided so as to be opposite from each other along the Y-axis perpendicular to the X-axis and the Z-axis. The bottom surface 26 corresponds to the fifth wall, the top surface 25 corresponds to the sixth wall, and the Y-axis corresponds to a third axis.

The bottom surface 26 includes the fixed legs 262, the adjustable leg 268, the step 263, and the first intake ports 264.

The fixed legs 262 and the adjustable leg 268 are the contact portions that come into contact with the installation surface at which the projector 1 is installed.

The step 263 is the noncontact portion that does not come into contact with the installation surface.

The first intake ports 264 are provided at the step 263, and the flow path resistance exerted by the first intake ports 264 is smaller than the flow path resistance exerted by the communication ports 2CA1. The step 263 has a configuration in which the portion where the first intake ports 264 are provided is continuous with the rear surface 22.

The speaker housing 61 is disposed so as to oppose each of the rear surface 22 and the bottom surface 26. In detail, the speaker housing 61 is disposed so as to oppose each of the communication ports 2CA1 and the first intake ports 264.

The first fan 51 communicates with the communication ports 2CA1 and the first intake ports 264, and sucks the air outside the exterior housing 2.

The sealer 66 separates the first sound emitter 62 from the second sound emitters 63 and 64. The sealer 66 surrounds the first sound emitter 62 to constitute the first duct 52, which causes the first fan 51 to communicate with the communication ports 2CA1 and the first intake ports 264.

According to the configuration described above, when the first fan 51 is driven, the air outside the exterior housing 2 is introduced into the exterior housing 2 via the first intake ports 264, which exert a flow path resistance smaller than the flow path resistance exerted by the communication ports 2CA1, and flows to the first fan 51. That is, out of the outside air introduced into the exterior housing 2, the outside air introduced into the exterior housing 2 via the communication ports 2CA1 is less than the outside air introduced into the exterior housing 2 via the first intake ports 264, so that the communication ports 2CA1 are unlikely to be blocked by dirt and dust contained in the outside air. The sound emitted from the first sound emitter 62 provided in the speaker housing 61, which is disposed so as to oppose the rear surface 22 and the bottom surface 26, is a lower-pitched sound than the sounds emitted from the second sound emitters 63 and 64. Part of the low-pitched sound emitted from the first sound emitter 62 is therefore emitted via the communication ports 2CA1, via which a small amount of outside air flows, so that the quality of the sound emitted from the first sound emitter 62 can be maintained.

On the other hand, when the first intake ports 264 are blocked by an obstacle or any other object, the first fan 51 sucks the air outside the exterior housing 2 via the communication ports 2CA1, so that a decrease in the efficiency at which the cooling targets are cooled by the gas caused to flow by the first fan 51 can be suppressed. In addition, since the air outside the exterior housing 2 can be introduced into the exterior housing 2 via the communication ports 2CA1, which serve as the sound emission port of the first sound emitter 62, it is not necessary to separately provide an outside air intake port via which the outside air is taken in in an emergency. Therefore, the configuration described above can suppress the complication of the configuration of the projector 1, and contribute to reduction in the size of the projector 1.

When the sounds emitted from the second sound emitters 63 and 64 are higher-pitched sounds than the low-pitched sound emitted from the first sound emitter 62, and the airflow flows to the second sound emitters 63 and 64, the high-pitched sounds emitted from the second sound emitters 63 and 64 are readily affected by the airflow.

In contrast, the first sound emitter 62 is separated by the sealer 66 from the second sound emitters 63 and 64, so that the situation in which the airflow flows to the second sound emitters 63 and 64 can be avoided. The influence of the airflow on the sounds emitted from the second sound emitters 63 and 64 can therefore be suppressed, so that the projector 1 provided by the first embodiment is capable of suppressing the deterioration of the output sound.

Second Embodiment

A second embodiment of the present disclosure will next be described.

The projector according to the present embodiment has the same configuration as that of the projector 1 according to the first embodiment. In the projector according to the present embodiment, the first duct is formed by the inner surface of the exterior housing and a frame accommodated in the exterior housing, and the speaker unit is disposed in the first duct. The projector according to the present embodiment differs in this regard from the projector 1 according to the first embodiment. In the following description, portions that are the same or substantially the same as the portions having been already described have the same reference characters and will not be described.

Figure 13:
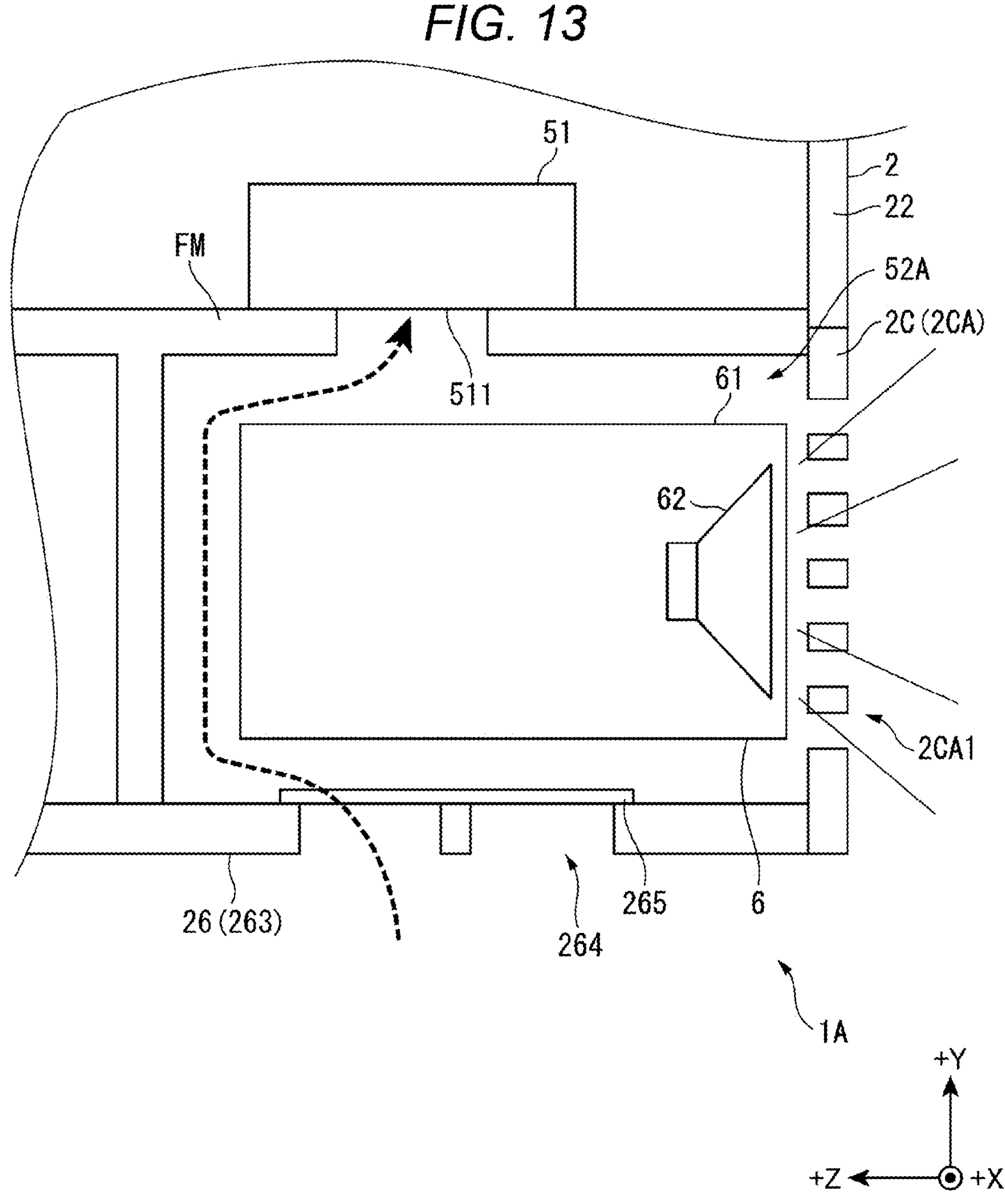
FIG. 13 is a diagrammatic view showing the internal configuration of the projector according to a second embodiment.

FIG. 13 is a diagrammatic view showing the internal configuration of a projector 1A according to the present embodiment.

The projector 1A according to the present embodiment has the same configuration and functions as those of the projector 1 according to the first embodiment except that the first duct 52 is replaced with a frame FM and a first duct 52A shown in FIG. 13.

The frame FM is accommodated in the exterior housing 2, and constitutes the first duct 52A, which causes the first intake ports 264 and the communication ports 2CA1 to communicate with the intake section 511 of the first fan 51. In the present embodiment, the first intake ports 264 and the communication ports 2CA1 each cause the exterior of the exterior housing 2 to communicate with the interior of the first duct 52A.

The speaker unit 6 is disposed in the first duct 52A. The outer surface of the speaker housing 61 of the speaker unit 6 therefore constitutes the inner wall of the first duct 52A. Part of the cooling gas introduced into the first duct 52A flows along the outer surface of the speaker housing 61 toward the positive end of the Y direction and is sucked by the first fan 51.

The first sound emitter 62 provided in the speaker unit 6 outputs the sound via the communication ports 2CA1. In the present embodiment, the first sound emitter 62 is shown as a full-range speaker in FIG. 12, but not necessarily. The first sound emitter 62 may be a port of a bass reflex duct, as the first sound emitter 62 according to the first embodiment is, or a passive radiator. When the first sound emitter 62 is the port described above, the porous member 65, which covers the first sound emitter 62, may be provided between the speaker housing 61 and the inner surface of the fabric unit 2C.

Effects of Second Embodiment

The projector 1A according to the present embodiment described above provides the effects below as well as the same effects provided by the projector 1 according to the first embodiment.

The projector 1A includes the first duct 52A, which causes the communication ports 2CA1 and the first intake ports 264 to communicate with the first fan 51. The speaker unit 6 is disposed in the first duct 52.

According to the configuration described above, when the first intake ports 264 are not blocked, the air outside the exterior housing 2 introduced into the first duct 52A via the first intake ports 264 flows along the speaker housing 61 and is sucked by the first fan 51. That is, the outer surface of the speaker housing 61 can be used as the inner surface of the first duct 52A. The size of the projector 1 can thus be reduced as compared with the case where the speaker housing 61 and the first duct 52A are separately provided.

Third Embodiment

A third embodiment of the present disclosure will next be described.

The projector according to the present embodiment has the same configuration as that of the projector 1A according to the second embodiment, but differs therefrom in that the speaker unit further includes another sound emitter and another sealer. In the following description, portions that are the same or substantially the same as the portions having been already described have the same reference characters and will not be described.

Figure 14:
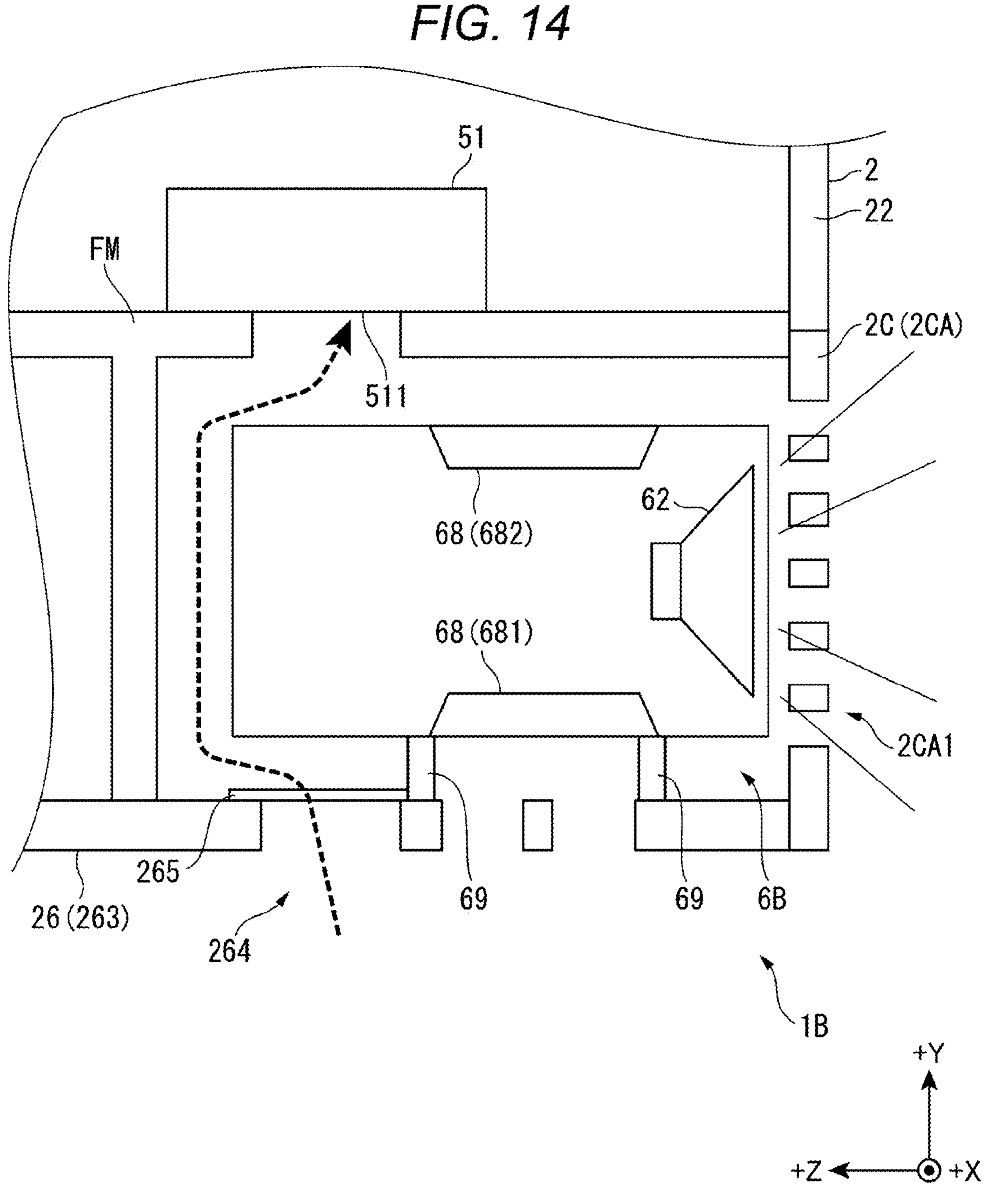
FIG. 14 is a diagrammatic view showing the internal configuration of the projector according to a third embodiment.

FIG. 14 is a diagrammatic view showing the internal configuration of a projector 1B according to the present embodiment.

The projector 1B according to the present embodiment has the same configuration and functions as those of the projector 1A according to the second embodiment except that the speaker unit 6 is replaced with a speaker unit 6B shown in FIG. 14.

The speaker unit 6B is disposed inside the first duct 52A. The speaker unit 6B has the same configuration as that of the speaker unit 6 according to the first and second embodiments except that the speaker unit 6B further includes two low-pitched sound emitters 68 and a sealer 69. The first sound emitter 62 of the speaker unit 6B according to the present embodiment is formed of a speaker, and emits a sound out of the exterior housing 2 via the communication ports 2CA1, as the first sound emitter 62 of the speaker unit 6 does. That is, in the present embodiment, the first sound emitter 62 can emit a higher-pitched sound than the sound emitted from the low-pitched sound emitters 68.

The two low-pitched sound emitters 68 are sound emitters that emit low-pitched sounds. The two low-pitched sound emitters 68 are each oriented not to oppose the rear surface 22.

Out of the two low-pitched sound emitters 68, a first low-pitched sound emitter 681 is disposed at the sixth surface 616 with the sound emission surface facing the negative end of the Y direction. In detail, the first low-pitched sound emitter 681 is provided at the sixth surface 616 at a position where the first low-pitched sound emitter 681 opposes the first intake ports 264 of the bottom surface 26.

Out of the two low-pitched sound emitters 68, a second low-pitched sound emitter 682 is disposed at the fifth surface 615 with the sound emission surface facing the positive end of the Y direction. One of the first low-pitched sound emitter 681 and the second low-pitched sound emitter 682 may be omitted.

The sealer 69 surrounds the first low-pitched sound emitter 681 when viewed from the side facing the negative end of the Y direction, and is in contact with the sixth surface 616 and the inner surface of the bottom surface 26.

In the present embodiment, the dimension of the first intake ports 264 along the Z-axis is greater than the dimension of the first low-pitched sound emitter 681 along the Z-axis. A portion of the first intake ports 264 that is not surrounded by the sealer 69 therefore functions as the intake ports via which the cooling gas in the first duct 52A is introduced. The mesh 265 is disposed inside the exterior housing 2 at the portion of the first intake ports 264 that is not surrounded by the sealer 69.

On the other hand, the portion of the first intake ports 264 that is surrounded by the sealer 69 functions as the sound emission port of the first low-pitched sound emitter 681 disposed inside the portion surrounded by the sealer 69.

The dimension of the first intake ports 264 along the X-axis may be greater than the dimension of the first low-pitched sound emitter 681 along the X-axis.

Effects of Third Embodiment

The projector 1B according to the present embodiment described above provides the effects below as well as the same effects provided by the projector 1A according to the second embodiment.

In the projector 1B, the speaker unit 6B includes the low-pitched sound emitters 68. The low-pitched sound emitters 68 are disposed in the speaker housing 61 and oriented not to oppose the rear surface 22, and emit low-pitched sounds.

The directivity of a low-pitched sound is lower than the directivity of a high-pitched sound. The low-pitched sound emitters 68 therefore do not need to oppose the rear surface 22 provided with the communication ports 2CA1, which the speaker housing 61 opposes. The low-pitched sound emitters 68, which emit low-pitched sounds, can therefore be disposed in the speaker housing 61 with increased layout flexibility.

Variations of Embodiments

The present disclosure is not limited to the embodiments described above, and variations, improvements, and other modifications to the extent that the advantage of the present disclosure is achieved fall within the scope of the present disclosure.

It is assumed in each of the embodiments described above that the noncontact portion in which the first intake ports 264 are provided in the exterior housing 2 is the step 263 provided at a level shifted toward the top surface 25 from the contact sections of the fixed legs 262 and the adjustable leg 268 that come into contact with the installation surface, but not necessarily. The noncontact portion in which the first intake ports 264 are provided in the exterior housing 2 may be the rear inclining surface 27B extending to the rear surface 22 and the bottom surface 26.

In this case, the situation in which the first intake ports 264 are blocked by the installation surface can be avoided. The air outside the exterior housing 2 can therefore be introduced into the exterior housing 2 via the first intake ports 264.

It is assumed in each of the embodiments described above that the sealer 66 separates the first sound emitter 62 from the second sound emitters 63 and 64. The thus configured sealer 66 may, however, be omitted. In this case, in the speaker unit 6, the second sound emitters 63 and 64, which emit different pitched sounds from the sound emitted from the first sound emitter 62, may emit the sounds via the same communication ports as those for the first sound emitter 62 as the sound emission port. That is, the communication ports 2CA1, the right sound emission port 2CR1, and the left sound emission port 2CL1 may be the same communication ports that cause the interior and the exterior of the exterior housing 2 to communicate with each other.

Also in the configuration described above, the flow rate of the outside air flowing through the communication ports that serve as the sound emission port of each of the sound emitters 62 to 64 is smaller than the flow rate of the outside air flowing through the first intake ports 264. The quality of the sound emitted from each of the first sound emitter 62 and the second sound emitters 63 and 64 and passing through the communication ports can therefore be maintained.

It is assumed in each of the embodiments described above that the speaker units 6 and 6B each include the second sound emitters 63 and 64 in addition to the first sound emitter 62, but not necessarily. The speaker units 6 and 6B may each not include the second sound emitters 63 and 64. The speaker units 6 and 6B may each include one of the second sound emitters 63 and 64. That is, the number of second sound emitters provided in the speaker unit in the present disclosure can be changed as appropriate.

It is assumed in each of the embodiments described above that the speaker units 6 and 6B are each provided at a position where the speaker unit 6 or 6B opposes the inner surface of the rear surface 22 and the inner surface of the bottom surface 26 of the exterior housing 2, but not necessarily. The position of the speaker unit 6 in the exterior housing 2 can be changed as appropriate. For example, the speaker units 6 and 6B may each be provided at a position where the speaker unit 6 or 6B opposes the inner surface of the front surface 21 and the inner surface of the bottom surface 26 of the exterior housing 2. In this case, the front surface 21 corresponds to the first wall.

It is assumed in each of the embodiments described above that the fixed legs 262 and the adjustable leg 268 are provided at the bottom surface 26 as the contact portions that come into contact with the installation surface, but not necessarily. The legs 262 and 268 may not be provided. In this case, portions of the bottom surface 26 that come into contact with the installation surface are the contact portions.

It is assumed in each of the embodiments described above that the speaker housing 61 has the recess 617 at the first surface 611, which opposes the inner surface of the rear surface 22 as the first wall, and the airflow flowing to the first fan 51 flows to the recess 617, but not necessarily. The recess 617 may be omitted.

It is assumed in each of the embodiments described above that the mesh 265 is provided at the first intake ports 264, but not necessarily. For example, when the first intake ports 264 are formed by sufficiently fine holes, the mesh 265 may be omitted.

It is assumed in the first embodiment described above that the speaker housing 61 is provided with the porous member 65, which covers at least part of the first sound emitter 62, but not necessarily. The porous member 65 may be omitted. Even when the porous member 65 is provided, the porous member 65 may not completely cover the first sound emitter 62.

It is further assumed that the porous member 65 is disposed at a position where the porous member 65 covers the exit-side port of the bass reflex duct BR in the speaker housing 61, but not necessarily. The position of the porous member 65, which reduces the flow speed of the air that exits out of the bass reflex duct BR, is not limited to the position where the porous member 65 covers the exit-side port outside the speaker housing 61. For example, the porous member 65 may be provided in the middle of the bass reflex duct BR, or may be disposed at a position where the porous member 65 covers the entrance-side port of the bass reflex duct BR inside the speaker housing 61. The aforementioned arrangement of the porous member 65 also allows reduction in port noise and wind noise generated at the exit-side port.

It is assumed in each of the embodiments described above that the projectors 1, 1A, and 1B each include the three optical modulators 352R, 352G, and 352B, but not necessarily. The present disclosure is also applicable to a projector including two or fewer or four or greater number of light modulators.

It is assumed in each of the embodiments described above that the image projection apparatus 3 includes the optical parts arranged in the layout shown in FIG. 5, but not necessarily. The optical parts provided in the image projection apparatus 3 and the layout of the optical parts are not limited to those described above.

It is assumed in each of the embodiments described above that the light source apparatus 31 includes the light emitter 3111, the wavelength converter 316, and the diffusive reflector 319, but not necessarily. The configuration of the light source apparatus 31 is not limited to the configuration described above. For example, the light source apparatus 31 may include a light emitter that emits red light, a light emitter that emits green light, and a light emitter that emits blue light, or may include a discharge light source lamp.

It is assumed in each of the embodiments described above that the light modulators 352 each include a transmissive liquid crystal panel having a light incident surface and a light exiting surface different from each other, but not necessarily. The light modulators 352 may include reflective liquid crystal panels each having a surface that serves both as the light incident surface and the light exiting surface in place of the transmissive liquid crystal panels. Furthermore, a light modulator using any component other than a liquid-crystal-based component, such as a device using micromirrors, for example, a digital micromirror device (DMD), may be employed as long as the component is capable of modulating an incident luminous flux to form an image according to image information.

Summary of Present Disclosure

The present disclosure will be summarized below as additional remarks.

Additional Remark 1

A projector including
- an exterior housing having a first wall and a second wall provided so as to be opposite from each other in a first axis, a third wall and a fourth wall provided so as to be opposite from each other in a second axis perpendicular to the first axis, and a fifth wall and a sixth wall provided so as to be opposite from each other in a third axis perpendicular to the first and second axes,
- a speaker unit including a speaker housing and a first sound emitter provided in the speaker housing, and
- a fan provided inside the exterior housing, in which
- the first wall has a communication port that causes the interior and the exterior of the exterior housing to communicate with each other to form a sound emission port of the first sound emitter,
- the fifth wall includes
- a contact portion that comes into contact with an installation surface,
- a noncontact portion that is provided continuously with the first wall and does not come into contact with the installation surface, and
- an intake port that is provided at the noncontact portion and exerts a flow path resistance smaller than the flow path resistance exerted by the communication port,
- the speaker housing is disposed so as to oppose each of the communication port and the intake port, and
- the fan communicates with the communication port and the intake port and sucks the air outside the exterior housing.

According to the configuration described above, the air outside the exterior housing flows to the fan disposed inside the exterior housing via the intake port exerting a flow path resistance smaller than the flow path resistance exerted by the communication port, which serves as the sound emission port of the first sound emitter. The air outside the exterior housing is therefore unlikely to flow through the communication port, so that a situation in which the communication port is blocked by dirt and dust contained in the outside air can be avoided. The quality of the sound emitted from the first sound emitter and passing through the communication port can thus be maintained.

On the other hand, when the intake port is blocked by an obstacle or any other object, the outside air is allowed to flow into the exterior housing via the communication port. A decrease in the efficiency at which the cooling targets are cooled by the cooling gas caused to flow by the fan can therefore be suppressed. In addition, it is not necessary to separately provide an outside air intake port via which the outside air is taken in in an emergency. Therefore, the configuration described above can suppress the complication of the configuration of the projector, and contribute to reduction in the size of the projector.

Additional Remark 2

The projector described in the additional remark 1, in which
- the noncontact portion is a step provided at a level shifted from the contact portion toward the sixth wall.

The configuration described above can prevent the intake port provided at the noncontact portion from being blocked by the installation surface. The air outside the exterior housing can therefore be introduced into the exterior housing via the intake port.

Additional Remark 3

The projector described in the additional remark 1, in which
- the noncontact portion is an inclining surface extending along the first wall and the fifth wall.

The configuration described above can prevent the intake port provided at the noncontact portion from being blocked by the installation surface. The air outside the exterior housing can therefore be introduced into the exterior housing via the intake port.

Additional Remark 4

The projector described in any one of the additional remarks 1 to 3, in which
- the contact portion is a leg protruding from the fifth wall.

According to the configuration described above, when the projector is installed at the installation surface, the leg, which protrudes from the fifth wall, comes into contact with the installation surface, so that a gap is created between the installation surface and the fifth wall. The noncontact portion can therefore be separate from the installation surface, so that the separation can prevent the intake port from being blocked by the installation surface. The air outside the exterior housing can therefore be introduced into the exterior housing via the intake port.

Additional Remark 5

The projector described in any one of the additional remarks 1 to 4, in which the speaker unit includes a second sound emitter that emits a different pitched sound from the sound emitted from the first sound emitter with the communication port used as the sound emission port.

The flow rate of the outside air flowing through the communication port is smaller than the flow rate of the outside air flowing through the intake port, as described above. The quality of the sound emitted from each of the first sound emitter and the second sound emitter and passing through the communication port can therefore be maintained.

Additional Remark 6

The projector described in any one of the additional remarks 1 to 4, further including a sealer provided between the inner surface of the exterior housing and the speaker housing, in which the speaker unit includes a second sound emitter that is provided in the speaker housing and emits a different pitched sound from the sound emitted from the first sound emitter, the sealer separates the airflow flowing to the fan from the second sound emitter, and the exterior housing includes the sound emission port of the second sound emitter.

According to the configuration described above, the airflow flowing to the fan is unlikely to flow to the second sound emitter. The influence of the airflow on the sound emitted from the second sound emitter can therefore be suppressed. A decrease in the quality of the sound emitted from the second sound emitter can therefore be suppressed.

Additional Remark 7

The projector described in the additional remark 6, in which the second sound emitter is configured to emit a higher-pitched sound than the sound emitted from the first sound emitter.

When the airflow flows in a direction that intersects with the propagation direction of the high-pitched sound, the sound is muffled and other effects occur, so that the sound quality decreases.

In contrast, the sealer prevents the airflow flowing to the fan from flowing to the second sound emitter, so that a decrease in the quality of the high-pitched sound emitted from the second sound emitter can be suppressed. The projector can therefore emit a high-quality sound.

Additional Remark 8

The projector described in any one of the additional remarks 1 to 4, in which the speaker unit includes a sound emitter that is disposed in the speaker housing, is oriented not to oppose the first wall, and emits a low-pitched sound.

The directivity of a low-pitched sound is lower than the directivity of a high-pitched sound. The sound emitter that emits a low-pitched sound therefore does not need to oppose the first wall provided with the communication port, which the speaker housing opposes. The sound emitter that emits a low-pitched sound can therefore be disposed in the speaker housing with increased layout flexibility.

Additional Remark 9

The projector described in any one of the additional remarks 1 to 8, in which the speaker housing has a recess at an opposing surface that opposes the inner surface of the first wall, the first sound emitter is provided at the recess, and the airflow flowing to the fan flows to the recess.

According to the configuration described above, the recess provided in the speaker housing allows an increase in the distance between the opposing surface of the speaker housing and the inner surface of the first wall. The flow path of the airflow flowing between the opposing surface and the inner surface of the first wall can therefore be widened. Therefore, the airflow is allowed to efficiently flow to the fan, and generation of wind noise and other noise can be suppressed.

Additional Remark 10

The projector described in any one of the additional remarks 1 to 8, further including a duct that causes the communication port and the intake port to communicate with the fan, in which the speaker unit is disposed in the duct.

According to the configuration described above, when the intake port is not blocked, the air outside the exterior housing introduced into the duct via the intake port flows along the speaker housing and is sucked by the fan. That is, the outer surface of the speaker housing can be used as the inner surface of the duct. The size of the projector can thus be reduced as compared with the case where the speaker housing and the duct are separately provided.

Additional Remark 11

The projector described in any one of the additional remarks 1 to 10, in which the exterior housing includes a mesh provided at the intake port.

According to the configuration described above, the mesh can prevent dirt and dust from entering the exterior housing via the intake port.

Additional Remark 12

The projector described in any one of the additional remarks 1 to 11, in which the speaker unit includes a porous member that covers at least part of the first sound emitter.

According to the configuration described above, the airflow flowing from the intake port toward the fan flows while detouring the porous member. The influence of the airflow on the sound emitted from the first sound emitter can therefore be suppressed.

When the sound emitted from the first sound emitter is a low-pitched sound, the directivity of the sound is low as described above, and when the distance from the first sound emitter to the inner surface of the first wall is short, vibration of the first wall may generate noise.

In contrast, providing the porous member described above can suppress vibration of the first wall, and generation of noise.

Additional Remark 13

The projector described in any one of the additional remarks 1 to 11, in which the speaker unit includes a bass reflex duct, and a porous member, the bass reflex duct has an entrance-side port disposed in the speaker housing, and an exit-side port that is the first sound emitter, and the porous member is provided at any of a position where the porous member covers the entrance-side port, a position between the entrance-side port and the exit-side port, and a position where the porous member covers the exit-side port.

According to the configuration described above, the porous member reduces the flow speed of the air flowing through the bass reflex duct and output via the exit-side port, so that port noise and wind noise generated at the exit-side port can be reduced.

Additional Remark 14

A projector including an exterior housing having a first wall and a second wall provided so as to be opposite from each other in a first axis, a third wall and a fourth wall provided so as to be opposite from each other in a second axis perpendicular to the first axis, and a fifth wall and a sixth wall provided so as to be opposite from each other in a third axis perpendicular to the first and second axes, a speaker unit including a speaker housing, a first sound emitter provided in the speaker housing, and a second sound emitter configured to emit a higher-pitched sound than the sound emitted from the first sound emitter, a fan provided inside the exterior housing, and a sealer provided inside the exterior housing, in which the first wall has a communication port that causes the interior and the exterior of the exterior housing to communicate with each other to form a sound emission port of the first sound emitter, the fifth wall includes a contact portion that comes into contact with an installation surface, a noncontact portion that is provided continuously with the first wall and does not come into contact with the installation surface, and an intake port that is provided at the noncontact portion and exerts a flow path resistance smaller than the flow path resistance exerted by the communication port, the speaker housing is disposed so as to oppose each of the first wall and the fifth wall, the fan communicates with the communication port and the intake port and sucks the air outside the exterior housing, and the sealer separates the first sound emitter and the second sound emitter from each other and surrounds the first sound emitter to form a duct that causes the communication port and the intake port to communicate with the fan.

According to the configuration described above, when the fan is driven, the air outside the exterior housing is introduced into the exterior housing via the intake port, which exerts a flow path resistance smaller than the flow path resistance exerted by the communication port, and flows to the fan. That is, out of the outside air introduced into the exterior housing, the outside air introduced into the exterior housing via the communication port is less than the outside air introduced into the exterior housing via the intake port, so that the communication port is unlikely to be blocked by dirt and dust contained in the outside air. The sound emitted from the first sound emitter provided in the speaker housing, which is disposed so as to oppose the first wall and the fifth wall, is a lower-pitched sound than the sound emitted from the second sound emitter. Part of the low-pitched sound emitted from the first sound emitter is therefore emitted via the communication port, via which a small amount of outside air flows, so that the quality of the sound emitted from the first sound emitter can be maintained.

On the other hand, when the intake port is blocked by an obstacle or any other object, the fan sucks the air outside the exterior housing via the communication port, so that a decrease in the efficiency at which the cooling targets are cooled by the gas caused to flow by the fan can be suppressed. In addition, since the air outside the exterior housing can be introduced into the exterior housing via the communication port, which serves as the sound emission port of the first sound emitter, it is not necessary to separately provide an outside air intake port via which the outside air is taken in in an emergency. Therefore, the configuration described above can suppress the complication of the configuration of the projector, and contribute to reduction in the size of the projector.

When the sound emitted from the second sound emitter is a higher-pitched sound than the low-pitched sound emitted from the first sound emitter as described above, and the airflow flows to the second sound emitter, the high-pitched sound emitted from the second sound emitter is readily affected by the airflow.

In contrast, the first sound emitter is separated by the sealer from the second sound emitter, so that the situation in which the airflow flows to the second sound emitter can be avoided. The influence of the airflow on the sound emitted from the second sound emitter can therefore be suppressed, so that the projector capable of suppressing the deterioration of the output sound can be provided.

What is claimed is:

1. A projector comprising:

an exterior housing having a first wall and a second wall provided to be opposite from each other in a first axis, a third wall and a fourth wall provided to be opposite from each other in a second axis perpendicular to the first axis, and a fifth wall and a sixth wall provided to be opposite from each other in a third axis perpendicular to the first and second axes;

a speaker unit including a speaker housing and a first sound emitter provided in the speaker housing; and a fan provided inside the exterior housing, wherein the first wall has a communication port that causes an interior and an exterior of the exterior housing to communicate with each other to form a sound emission port of the first sound emitter, the fifth wall includes a contact portion that comes into contact with an installation surface, a noncontact portion that is provided continuously with the first wall and does not come into contact with the installation surface, and an intake port that is provided at the noncontact portion and exerts a flow path resistance smaller than a flow path resistance exerted by the communication port, the speaker housing is disposed to oppose each of the communication port and the intake port, and the fan communicates with the communication port and the intake port and sucks air outside the exterior housing.

2. The projector according to claim 1, wherein the noncontact portion is a step provided at a level shifted from the contact portion toward the sixth wall.

3. The projector according to claim 1, wherein the noncontact portion is an inclining surface extending along the first wall and the fifth wall.

4. The projector according to claim 1, wherein the contact portion is a leg protruding from the fifth wall.

5. The projector according to claim 1, wherein the speaker unit includes a second sound emitter that emits a different pitched sound from the sound emitted from the first sound emitter with the communication port used as a sound emission port.

6. The projector according to claim 1, further comprising a sealer provided between an inner surface of the external housing and the speaker housing, wherein the speaker unit includes a second sound emitter that is provided in the speaker housing and emits a different pitched sound from the sound emitted from the first sound emitter, the sealer separates an airflow flowing to the fan from the second sound emitter, and the exterior housing includes a sound emission port of the second sound emitter.

7. The projector according to claim 6, wherein the second sound emitter is configured to emit a higher-pitched sound than the sound emitted from the first sound emitter.

8. The projector according to claim 1, wherein the speaker unit includes a sound emitter that is disposed in the speaker housing and emits a low-pitched sound, and the sound emitter is oriented not to oppose the first wall.

9. The projector according to claim 1, wherein the speaker housing has a recess disposed at an opposing surface that opposes an inner surface of the first wall, the first sound emitter is provided at the recess, and an airflow flowing to the fan flows to the recess.

10. The projector according to claim 1, further comprising a duct that causes the communication port and the intake port to communicate with the fan, wherein the speaker unit is disposed in the duct.

11. The projector according to claim 1, wherein the exterior housing includes a mesh provided at the intake port.

12. The projector according to claim 1, wherein the speaker unit includes a porous member that covers at least part of the first sound emitter.

13. The projector according to claim 1, wherein the speaker unit includes a bass reflex duct, and a porous member, the bass reflex duct has an entrance-side port disposed in the speaker housing, and an exit-side port that is the first sound emitter, and the porous member is provided at one of a position where the porous member covers the entrance-side port, a position between the entrance-side port and the exit-side port, and a position where the porous member covers the exit-side port.

14. A projector comprising:

an exterior housing having a first wall and a second wall provided to be opposite from each other in a first axis, a third wall and a fourth wall provided to be opposite from each other in a second axis perpendicular to the first axis, and a fifth wall and a sixth wall provided to be opposite from each other in a third axis perpendicular to the first and second axes;

a speaker unit including a speaker housing, a first sound emitter provided in the speaker housing, and a second sound emitter configured to emit a higher-pitched sound than a sound emitted from the first sound emitter;

a fan provided inside the exterior housing; and a sealer provided inside the exterior housing, wherein the first wall has a communication port that causes an interior and an exterior of the exterior housing to communicate with each other to form a sound emission port of the first sound emitter, the fifth wall includes a contact portion that comes into contact with an installation surface, a noncontact portion that is provided continuously with the first wall and does not come into contact with the installation surface, and an intake port that is provided at the noncontact portion and exerts a flow path resistance smaller than a flow path resistance exerted by the communication port, the speaker housing is disposed to oppose each of the first wall and the fifth wall, the fan communicates with the communication port and the intake port and sucks air outside the exterior housing, and the sealer separates the first sound emitter and the second sound emitter from each other and surrounds the first sound emitter to form a duct that causes the communication port and the intake port to communicate with the fan.

* * * * *